US012571478B1

(12) United States Patent       (10) Patent No.:    US 12,571,478 B1
Mohamed                             (45) Date of Patent:      Mar. 10, 2026

(54) REMOVABLE REED VALVE CORE WITH AN ELASTIC SECURING BAND

(71) Applicant: Zahroof Mohamed, Cypress, TX (US)

(72) Inventor: Zahroof Mohamed, Cypress, TX (US)

( * ) Notice:  Subject to any disclaimer, the term of this patent is extended or adjusted under 35 U.S.C. 154(b) by 0 days.

(21) Appl. No.: 19/205,655

(22) Filed:  May 12, 2025

Related U.S. Application Data

(60) Provisional application No. 63/720,848, filed on Nov. 15, 2024.

(51) Int. Cl.
 *F16K 15/16*     (2006.01)
 *F16K 27/02*     (2006.01)
(52) U.S. Cl.
 CPC ........ *F16K 15/161* (2021.08); *F16K 27/0209* (2013.01)
(58) Field of Classification Search
 CPC ........................... F16K 15/161; F16K 27/0209
 See application file for complete search history.

(56)              References Cited

U.S. PATENT DOCUMENTS 7,028,649 B1 *   4/2006  Hosaluk .................. F01L 3/205
                                                  123/73 V
 11,454,162 B2 *   9/2022  Tassinari ............... F16K 15/031

* cited by examiner

*Primary Examiner* — P. Macade Nichols

(57)              ABSTRACT

The reed valve core comprises a reed cage, a reed, and a securing band. The reed cage has a top wall and two or more sidewalls defining an interior space. A fluid inlet and a fluid outlet are positioned in the top wall and one of the sidewalls, respectively. The reed is positioned over and is configured to seal the fluid outlet to occlude a flow of fluid from the fluid outlet. The securing band is positioned over the reed and the reed cage to fasten a top portion of the reed to a top portion of the sidewall in which the fluid outlet is positioned. The positioning of the securing band defines a bending axis for the reed to articulate and to displace the reed from the reed cage upon a fluid pressure differential being exerted on the reed.

26 Claims, 25 Drawing Sheets

Y ‑ Y

202a

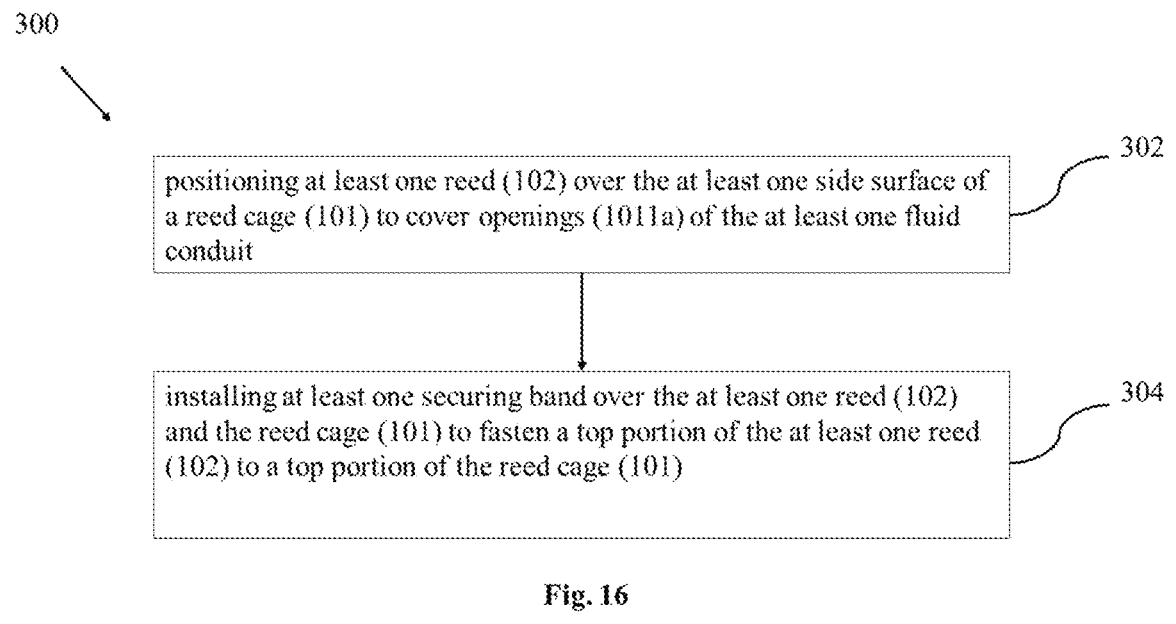

300

302 positioning at least one reed (102) over the at least one side surface of a reed cage (101) to cover openings (1011a) of the at least one fluid conduit

304 installing at least one securing band over the at least one reed (102) and the reed cage (101) to fasten a top portion of the at least one reed (102) to a top portion of the reed cage (101)

Fig. 16

REMOVABLE REED VALVE CORE WITH AN ELASTIC SECURING BAND

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The present disclosure generally relates to reed valve assemblies and more specifically relates to a reed valve core, which is removable, a reed valve assembly, and a method for assembling the reed valve core. Conventionally, one-way valves are devices that permit the flow of fluids in only one direction. Such one-way valves operate by allowing fluid to pass through the one-way valve when the pressure at an inlet portion of the one-way valve is greater than the pressure at an outlet portion of the one-way valve. If the pressure equalizes or reverses, the one-way valve closes to prevent backflow of fluid and thus maintains directional control of the fluid flowing through the valve. Therefore, one-way valves control the direction of the fluid flow passively, using the pressure differential across the one-way valve to allow flow in one direction and prevent reverse flow.

Reed valves are among the earliest forms of one-way valves for fluids. Reed valves typically consist of a flexible material that bends, based on a pressure difference, to open a fluid passage allowing the fluid to flow in the prescribed direction with the flexible material returning to its original position once the pressure difference reverses, thereby blocking the fluid passage and therefore reversing flow. Reeds in a reed valve have the functionality of both the sealing element and springs in other types of one-way valves. Reed valves are widely used in applications requiring fast and precise response to pressure changes, such as in compressors, pumps, and internal combustion engines.

In such known one-way valves, including reed valves, the flow of the fluid causes sealing elements to strike a housing at high velocity repeatedly, resulting in gradual wear of both the sealing elements and the housing. As a result, during servicing, the sealing elements and the springs are replaced, while the housing, which can be expensive, must be machined to restore its sealing faces. The housing can only be machined a limited number of times before it must be discarded due to insufficient remaining material. Consequently, the entire one-way valve is considered a consumable component. For the one-way valves to be serviced, careful inspection is required of the housing to determine the nature of the wear and to determine if there is enough material remaining so that it can be repaired or, if not, discarded. The inspection and machining requires sophisticated measuring instruments, skilled workmen and the repair work to be done in a precision machining shop, typically away from the location of the compressor/pump/engine. This process is expensive and requires time to perform. Because the machine cannot be down during this time, spare one-way valves are required to keep the process going. Capital costs to purchase both the operating one-way valves and spare one-way valves are high.

Reed valve technology has undergone significant advancements in recent times. As technology progressed, the reed valves evolved to incorporate improved sealing mechanisms, optimized flow paths, and materials with greater durability. Modern reed valves feature thin sheets of metal or composites, known as reed petals, which cover and uncover an orifice to regulate the flow of the fluids in various applications, including compressors, pumps and engines. During operation, the reed petals continuously impact against a metal housing during the opening and closing event to control the flow of the fluid. The flow of the fluid through a prior conventional art reed valve is tortuous and through very narrow passages leading to large losses. The main issue with conventional one-way valves is the wear and tear on the sealing elements and the metal housing, the difficulty to service it, its reliability in different applications, the valve losses that affects performance, the requirement of innumerable spare parts to maintain one-way valves in different sizes of valves in different compressors and in different applications.

These limitations continue to impede the efficiency, reliability, cost and case of maintenance of reed valves, underscoring the necessity for improved designs that can better meet the demands of modern industrial applications. Therefore, there is a need for a reed valve that is durable, minimizes wear on both the sealing elements and the housing, reduces the frequency and cost of servicing and manufacturing these one-way valves, and reduces the cost of maintaining machinery using these one-way valves. Moreover, such a reed valve should have a design leading to reduced number of parts or components to enhance the efficiency of service operations. Ideally, such a reed valve would eliminate the need for machining and allow for easier inspection and maintenance, thereby lowering operational costs, increasing the runtime of the machinery in which the reed valves are used, and reducing emissions.

(2) Description of Related Art Including Information Disclosed Under 37 CFR 1.97 and 1.98

GB496795A and U.S. Pat. No. 3,905,340 relate to reed valves for gas flow applications. The reeds are held to the reed cage by means of fasteners. In case of failure, broken fasteners can enter the machine and cause damage. The manufacturing process is expensive as it is labor intensive. In the case of U.S. Pat. No. 6,880,577B2, the reeds are secured to a reed cage by a rigid mechanical retainer, eliminating the use of fasteners or tools during manufacturing, making these valves cheaper to produce. The retainer, as described, is a mechanical rigid structure that locks the reeds to the reed cage by means of projections and slots, with the retainer also serving the purpose of a flange in most cases. However, the retainer has to be machined/cast or molded to fit a particular valve for a specific application and is not meant to be modular. The reeds in this design do not have a secure attachment to the reed cage along its bending axis, as there needs to be a clearance between the rigid retainer, reeds, and reed cage for assembly. This may be suitable for low pressure differential applications, such as two-stroke engines, but will result in failure in high pressure differential applications.

With further advancement in the field, as disclosed in U.S. Pat. No. 11,002,377B2, reed valve assemblies featuring a replaceable reed valve module comprising a module body, a reed cage, reed petals, and a petal guard is taught. However, in reed valves, the petal guard experiences significantly less wear-and-tear as compared to the reeds or the reed cage. Thus, requiring the replacement of the petal guard results in an increased maintenance cost. Furthermore, because the module in this design comprises both the reed and petal guard, to cater to all the different applications that requires different combinations of reed thickness and petal guard design, this design requires many more module part numbers to be stocked and manufactured. This increases both inventory and manufacturing costs for end user, manufacturer, distributor and valve servicing company.

Moreover, in such replaceable reed valve modules, the reeds are not securely attached to the reed cage in the modules. These modules can only be used as part of a valve assembly as it requires the valve seat to secure the reeds against the reed cage in the module. In the assembly, module height is manufactured such that the seat of the valve assembly pushes down against the reed cage of each module forcing the reeds in each module against its petal guard walls causing them to be clamped against the reed cage through friction. The height of the modules in such a valve assembly have to be tightly controlled. They have to all be within the same required height within a very tight tolerance. If the module height falls outside a specific range, the clamping force on the reeds may be too low to prevent proper retention. If it is too high, the wedge-shaped reed cage may damage the module housing causing the reeds to be released and fall into the machine causing expensive damage besides stopping production. In this design, the module height has to be controlled to obtain the proper gasket pressure between the module and the valve seat in the assembly that in turn determines the amount of leakage through these valves. Manufacturing modules to the required tight tolerance, leads to costly parts. The reeds in this design are supported on the exposed ends of lateral ribs in the reed cage that have to be sufficiently and suitably spaced to support the reed against a high-pressure differential. Therefore, high pressure differential applications require a number of ribs that impede the flow through these modules, adversely affecting the efficiency of the valves.

BRIEF SUMMARY OF THE INVENTION

In order to address the above-mentioned problems and/or limitations, the present disclosure provides a unique removable reed valve core and a reed valve assembly thereof. The following presents a simplified summary of the disclosure in order to provide a basic understanding of some aspects of the subject matter that is described in further detail below. This summary is not an exhaustive overview of the disclosure, nor is it intended to identify key or critical elements of the subject matter disclosed here. Its sole purpose is to present some concepts in a simplified form as a prelude to the more detailed description that is discussed later.

An embodiment of the disclosure meets the needs presented above by generally comprising removable reed valve core(s). The reed valve core may include a reed cage with a top wall, which has a fluid inlet positioned therein, and two or more sidewalls defining an interior space of the reed cage. At least one sidewall has a fluid outlet positioned therein and being in fluid communication with the fluid inlet. A reed is positioned over the at least one sidewall of the reed cage comprising of the fluid outlet and is configured to seal and occlude a flow of fluid from the fluid outlet. A securing band is positioned over the reed and the reed cage to fasten a top portion of the reed to a top portion of the two or more sidewalls of the reed cage. Positioning of the securing band defines a bending axis for the reed to articulate and displace the reed from the reed cage upon a fluid pressure differential being exerted on the reed.

Another embodiment of the disclosure includes a reed valve assembly, which may comprise a machine or a component thereof, and which comprises a reed valve core, which is selectively removable from the reed valve assembly. The reed valve assembly includes a top plate having a fluidic opening positioned therein. The reed valve core is described above and is coupled to the top plate so that the fluid inlet in its top wall is in fluid communication with the fluidic opening of the top plate. A guard is configured to hold the reed valve core in position against the top plate.

Yet another embodiment of the disclosure includes a method for assembling a reed valve core. The method comprises a first step of providing a reed, a reed cage, and a securing band. Positioning of the reed over at least one sidewall of the reed cage to cover a fluid outlet in the of the at least one sidewall. Lastly, the securing band is installed over the reed and the reed cage to fasten a top portion of the reed to a top portion of the at least one sidewall, wherein the securing band positioning defines a bending axis for the reed to articulate and displace the reed from the reed cage upon a fluid pressure differential being exerted on the reed.

Collectively, these innovations offer significant commercial advantages. By addressing the limitations of previous reed valve designs, this invention provides a more reliable and efficient solution that reduces maintenance costs, extends the lifespan of components, and improves overall system performance. The ability to easily adapt and replace parts in a modular fashion also reduces downtime, leading to increased productivity and cost savings. These features make the invention highly attractive for a wide range of industrial applications, offering both operational and economic benefits.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 16 illustrates flowchart for a method for assembling a reed valve core, in accordance with an embodiment of the present disclosure.

DETAILED DESCRIPTION OF THE INVENTION

Figures 1A, 1B:
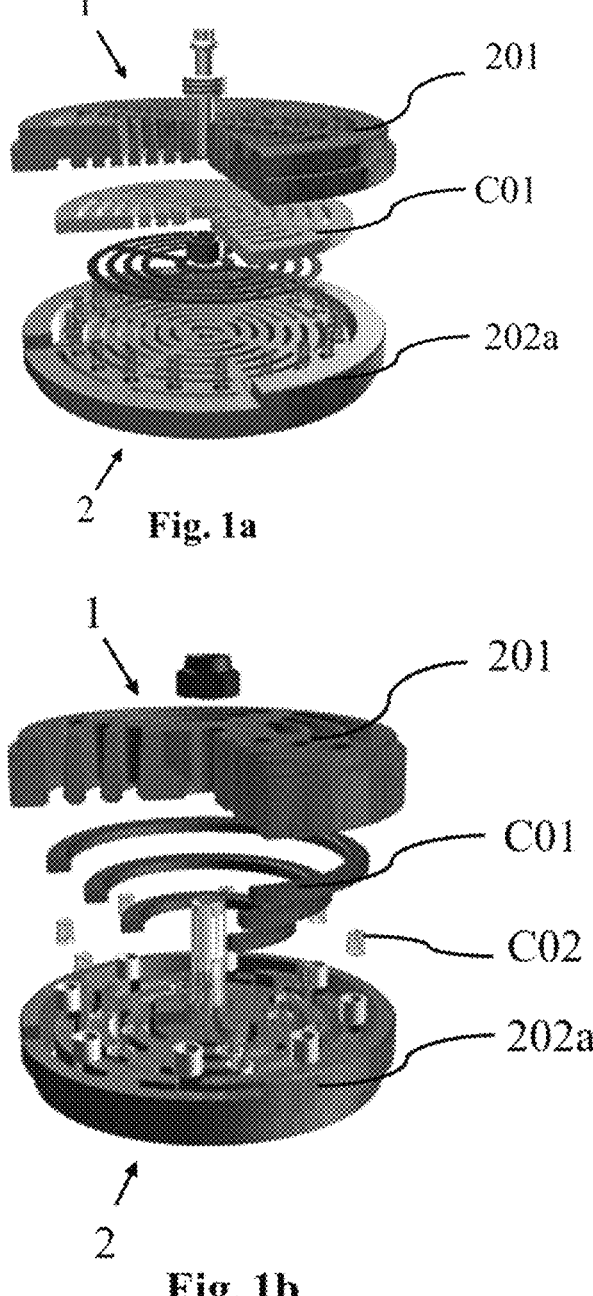
FIG. 1a illustrates an exemplary embodiment of a plate valve, which is a conventional one-way valve used in reciprocating compressors.
FIG. 1b illustrates an exemplary embodiment of a ring valve, which is a conventional one-way valve used in reciprocating compressors.

In the following description, for purposes of explanation, numerous specific details are set forth in order to provide a thorough understanding of the invention. It will be apparent, however, to one skilled in the art that the invention can be practiced without these specific details. Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments, but not other embodiments.

The figures illustrate the architecture, functionality, and operation of possible implementations according to various embodiments of the present invention. It should also be noted that, in some alternative implementations, the functions noted/illustrated may occur out of the order noted. For example, two blocks shown in succession may, in fact, be executed substantially concurrently, or the blocks may sometimes be executed in the reverse order, depending upon the functionality involved.

When introducing elements of various embodiments of the present invention, the articles "a," "an," "the," and "the" are intended to mean that there are one or more of the elements. The terms "comprising," "including," and "having" are intended to be inclusive and mean that there may be additional elements other than the listed elements. Moreover, the use of "top," "bottom," "above," "below," and variations of these terms is made for convenience, but does not require any particular orientation of the components.

The present disclosure provides a reliable, efficient, cost effective and easy to maintain a reed valve assembly 200 that overcomes the limitations of the conventional art. The reed valve assembly 200 is manufactured with replaceable components that improves its reliability, reduces its cost to manufacture, reduces the cost of service, and reduces the cost of inventory to maintain machines running with these reed valve assemblies 200. In the present disclosure, the reed valve assemblies 200 have removable components like reed valve cores 100, which can be independently removed from the reed valve assembly 200 during service.

In the present disclosure, a housing of the reed valve assembly 200 does not require machining when the reed valve assembly 200 is serviced. Servicing of the housing typically only involves cleaning the housing of oil and debris, on site, to restore the surface. By eliminating the machining of the expensive housing during repair, the housing is not consumed over time and the reed valve assembly 200 has a long lifetime. By replacing the parts that wear without any machining, the cost of servicing the reed valve assembly 200 is minimized. Further, carrying out the work on-site instead of at a precision machine shop, the transportation cost and the cost of servicing the reed valve assembly 200 is minimized. Further, it also eliminates the need to purchase spare reed valve assemblies 200 that are required if the reed valve assembly 200 that are repaired take a long time to be transported off-site to be serviced properly. The quantity of spare parts that need to be stocked to service these reed valve assemblies 200 is a fraction of that required with other valves.

The present disclosure provides reed valve assemblies 200 that can also be used as one-way valves in other applications, such as non-return valves for pipelines, as relief valves, and for turbomachinery and other applications that require a fast response time.

Further, for the reed valve module of prior art, the requirement of a seat plate with conduits in them on top of the reed valve module increases the clearance volume or dead space in applications such as discharge valves in a compressor. The dead space adversely affects the volumetric efficiency and hence the performance of the compressor. The present reed valve cores 100 can be used with a top plate and thus without the requirement of seating surfaces with conduits in them, results in lower cylinder clearance volume, higher volumetric efficiency and better performance. This is very beneficial in small compressors with high pressure ratios.

Further, for conventional reed valves where the reeds 102 are attached to the reed cage 101 by threaded fasteners, the assembly process is expensive and subject to quality issues. The present disclosure includes a securing band 103 for attachment of the reed 102 to the reed cage 101, thereby making assembly of the reed valve cores 100 simple and easily automated, which reduces cost and improves quality.

Further, for prior art reed valve assemblies that use a rigid retainer to retain the reeds 102 and serve as a structure of the reed valve assembly, such as a flange, or in reed valve assemblies that used a housing to retain the reeds 102, that also served as a guard, the material of the retainer or the housing was compromised in serving both functions. In the present disclosure, the reeds 102 are attached to the reed valve core 100 using the securing band 103, which comprises materials to optimally withstand temperature and fatigue stresses to which it is subjected. This is especially important when the reed valve assemblies 200 are used in applications at high temperatures and high speeds.

The securing band 103 independently secures the reed 102 to the reed cage 101 and simplifies design, improves performance, improves reliability, reduces the cost of manufacturing, simplifies inspection and requires less maintenance.

In conventional reed valves that are utilized in high pressure differential applications, there are lateral ribs that run across an interior space of the reed cage 101 cavity and end with its exposed ends flush with the sidewall in which the fluid outlets are positioned, defining equally spaced fluid outlets 1015 in the sidewall. The spacing between the lateral ribs is designed such that a reed 102 of a particular thickness, when supported by the exposed ends of the lateral ribs defining the fluid outlet width, and in its closed position, subject to the differential pressure, will not buckle into the fluid outlet 1015. However, depending on the total width of the fluid outlet 1015 in the sidewall 1018, several thick ribs may be required to provide the required narrow width for the fluid outlet 1015. The presence of a number of thick ribs within the interior space of the reed cage 101 acts as a resistance to the flow of fluid through the reed cage 101. This results in higher valve losses, higher power consumption and lower efficiency. The present disclosure shows a reed cage 101 used in a high pressure application where the sidewall 1018 is thickened and the required fluid outlet 1015 widths are cut directly into the sidewall(s) 1018 without any lateral ribs. The reeds 102 are supported by the sections 1018a of sidewall 1018 surrounding each fluid outlet 1015 and prevent the reed 102 from buckling. The interior space of the reed cage 101 has no ribs to impede flow, and thence the valve has low losses, lower power consumption and better efficiency than a conventional reed valve.

In another embodiment of the present disclosure, where a reed valve assembly 200 is used in very high pressure-differential applications, each section 1018a of sidewall 1018 surrounding each fluid outlet 1015 in the thickened sidewall may be further reinforced by a thin rib. The reed 102 still is supported by the sections 1018a of sidewall 1018 surrounding each fluid outlet 1015 and the ribs are much thinner than the width of the walls on either side of the fluid outlet 1015. There is less rib surface area that the fluid contacts when flowing through the reed cage 101. This design reduces the resistance to flow of a fluid through the reed cage 101, making it have lower losses, lower power consumption and higher efficiency than a conventional reed valve used in this application.

Further, in another embodiment of the present disclosure, for a reed valve assembly used in very high pressure-differential applications, the sidewalls 1018 of the reed cage 101 that do not have fluid outlets are reinforced by one or more ribs. This allows the sidewalls 1018 to be thinner than when designed without a rib. The optimal usage of the thickness of the wall and the use of ribs will result in the least amount of resistance to flow of fluid through the reed cage 101, resulting in lower losses, lower power consumption and higher efficiency.

Further, in another embodiment of the present disclosure, for a reed valve assembly used in very high pressure-differential applications, the ribs are designed so that it reinforces a wall to a top of the wall. But the ribs are angled from 30 degrees to 60 degrees upwardly to the section of the sidewall it reinforces, such that the top surface of the ribs fall below a top of the fluid outlet 1015 on the sealing face of the reed cage 101 as much as possible. This design reduces the contact of the fluid with the ribs as it flows through the reed cage 101, resulting in higher flow area and lower losses.

Further, conventional valve assemblies have a single guard plate that is fastened using threaded fasteners to the valve seat plate. This valve assembly has a split line at the interface of the seat and guard plates that is upstream of the gasket between the valve assembly and compressor/pump cylinder in the case of a typical suction valve of a compressor/pump. This split line is exposed to the suction side of the valve and is a leak path for the fluid on the discharge side of the valve. The mating surfaces of the seat plate and guard plate have to be maintained carefully to be flat and defect free to prevent leakage. An embodiment of this disclosure presents a valve assembly where the guard plate sits in a recess in the valve top plate, thereby eliminating the split line and leakage path.

Another embodiment of this disclosure presents a reed valve assembly where, instead of a single guard plate comprising of one or more guards, one or more individual guards are designed with snap fit mechanisms at their ends to snap-fit into a shelf built into the top plate. The split-line between the guard plate and the seat plate in a conventional valve is eliminated. The snap-fit mechanism also eliminates the threaded fasteners used in conventional valves that can back out due to vibration and cause the valve to come apart during operation.

In a prior art reed valve assemblies comprising modules there is not a way to accurately control the gasket pressure on the seating surface between the modules and the valve seat. Hence this could be a source of leakage. The present disclosure mitigates this issue by providing a carrier that allows deflection and a controlled stiffness to maintain a constant, known, gasket pressure between the seating surface of the reed valve core and a seat plate, thereby minimizing leakage in reed valve assemblies with a seat plate.

Still further, the present disclosure discloses a carrier that provides a controlled deflection/stiffness to the reed valve cores that allows for a looser tolerance in the machining of the valve core height enabling the ability to interchange reed valve cores between reed valve assemblies of different sizes and in different applications, providing better standardization, more flexibility and versatility, reducing failure and reducing the cost of manufacturing the reed valve assemblies.

Furthermore, in the present disclosure, the presence of a carrier enables accommodation of differential expansion of the reed valve core with respect to the top plate and guard plate of the reed valve assembly. In prior reed valve assemblies, differential thermal expansion of the reed module and the housing results in high stresses on the reed module leading to leakage and failure. The present disclosure mitigates the issue of leakage, stress and reed valve assembly failure due to thermal expansion.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1C:
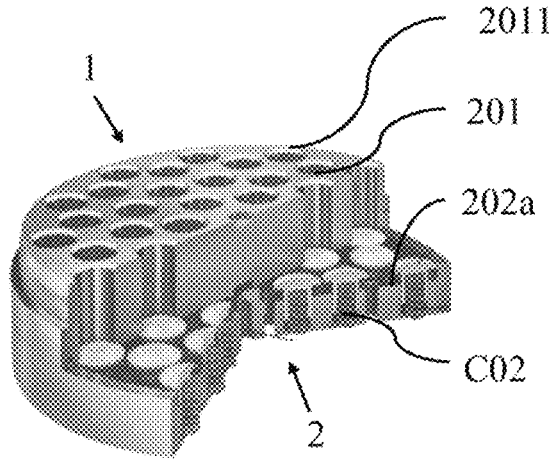
FIG. 1c illustrates an exemplary embodiment of a poppet valve, which is a conventional one-way valve used in reciprocating compressors.

FIG. 1 illustrates conventional one-way valves used in compressors, which open and close hundreds, if not thousands, of times a minute. The one-way valves allow flow only from an inlet region 1 to an outlet region 2, preventing any backflow through the valve. FIG. 1a illustrates a conventional plate valve, FIG. 1b illustrates a conventional ring valve, and FIG. 1c illustrates a conventional poppet valve. FIGS. 1a and 1b are exploded views of the valves. FIG. 1c is a perspective view of the valve with a section removed to show the internal components. These one-way valves all have a valve seat 201 and a valve guard plate 202a, together called a valve housing. Valve housings are expensive components and are repaired as much as possible to prolong the life of the one-way valve. The valve seat 201 has one or more fluid conduits 2011 in them that are exposed to the inlet region 1 and the valve guard plate 202a has openings in them that are exposed to the discharge region 2. These one-way valves have sealing elements C01, a plate in the case of the plate valve, rings in the case of the ring valve, and poppets in the case of the poppet valve, which are actuated by helical coil springs C02, that open and close the ports or fluid conduits 2011 in the valve seat 201 when a pressure differential acts on them, thereby allowing fluid to flow from the inlet region 1 to the discharge region 2 when the one-way valve is open, and preventing back flow when the one-way valve is closed. These one-way valves have a number of loose internal components, including sealing elements C01, springs C02 and bushings, that are assembled precisely in the valve assembly. Typically, these one-way valves are built to specific dimensions and in most designs, the internal components are neither interchangeable between one-way valves of different sizes nor suitable for use in varying applications. Because the internal components are neither compatible nor interchangeable across different one-way valve sizes or applications, numerous unique one-way valves with distinct components are manufactured to accommodate the various sizes and applications required in the industry. Because the components are not standardized, they are designed differently, and the one-way valves are manufactured and assembled in different ways. The requirement for the large number of parts and processes to assemble and maintain the one-way valves results in high manufacturing costs and high inventory costs for the one-way valve manufacturer, the one-way valve seller or distributor and the end user or service provider of the one-way valves. Therefore, the manufacture, maintenance and cost of repairs are complex and expensive with these one-way valves. Moreover, the flow path of the gas through these one-way valves is winding or tortuous, requiring substantial changes in direction while passing around the open sealing elements. This results in fluid escape, low efficiency and increased power consumption.

The present disclosure addresses the above issues with a design that has standard interchangeable parts that can be used across one-way valves of many sizes and in many applications, thereby reducing the number of components to be manufactured and stocked, reducing the processes required to manufacture and service the one-way valves, eliminates the need for machining during service and improves the flow of gas through the one-way valve.

Figure 2A:
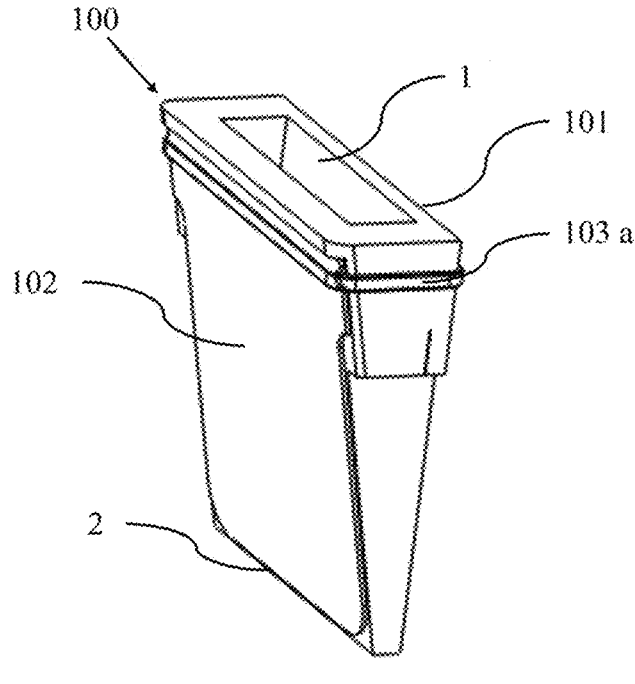
FIG. 2a illustrates a perspective view of a reed valve core, in accordance with an embodiment of the present disclosure.
Figure 2B:
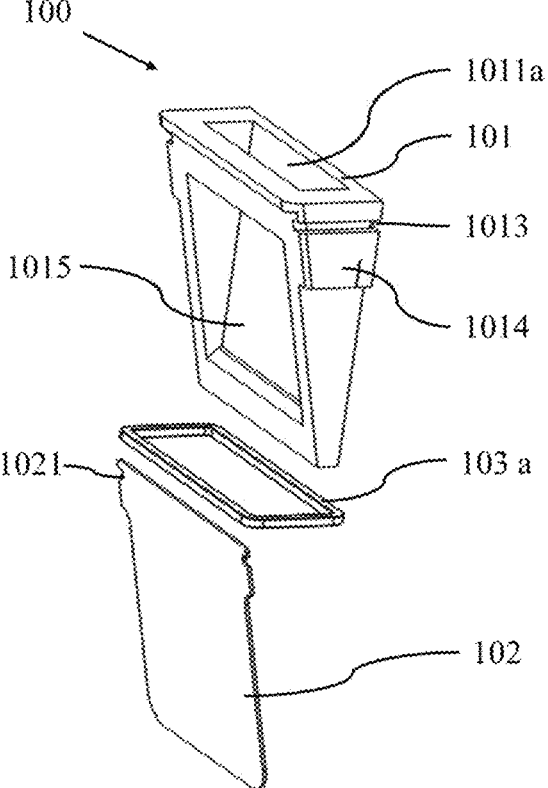
FIG. 2b illustrates an exploded view of the reed valve core of FIG. 2a, in accordance with an embodiment of the present disclosure.
Figure 2C:
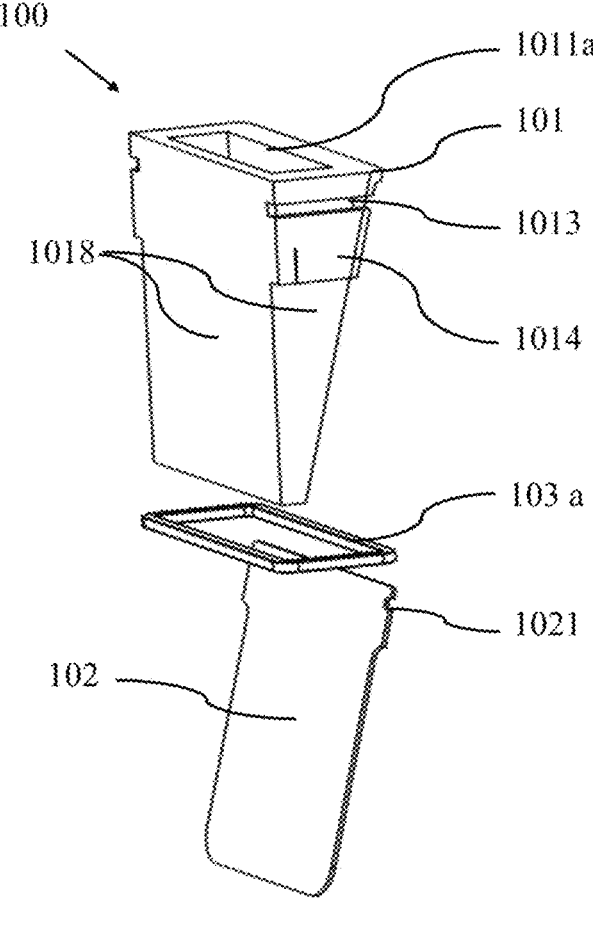
FIG. 2c illustrates another exploded view of the reed valve core of FIG. 2a, in accordance with an embodiment of the present disclosure.

A reed valve core 100, in accordance with an embodiment of the present disclosure, is shown in FIGS. 2a-c. The reed valve core 100 includes a reed cage 101, a reed 102 and a securing band 103. The reed cage 101 includes a top wall 1011 having a fluid inlet 1011a positioned therein. Further, the reed cage 101 as shown has four sidewalls 1018, which define a interior space 1020 of the reed cage 101. One of the sidewalls 1018 has a fluid outlet 1015 positioned therein and this sidewall 1018 acts as a sealing face 1012. The reed 102 is positioned over the sealing face 1012 such that it completely covers the fluid outlet 1015 on this sealing face 1012 when the reed 102 is in a closed position and thereby blocks any flow of fluid through the fluid outlet 1015.

Figure 3A:
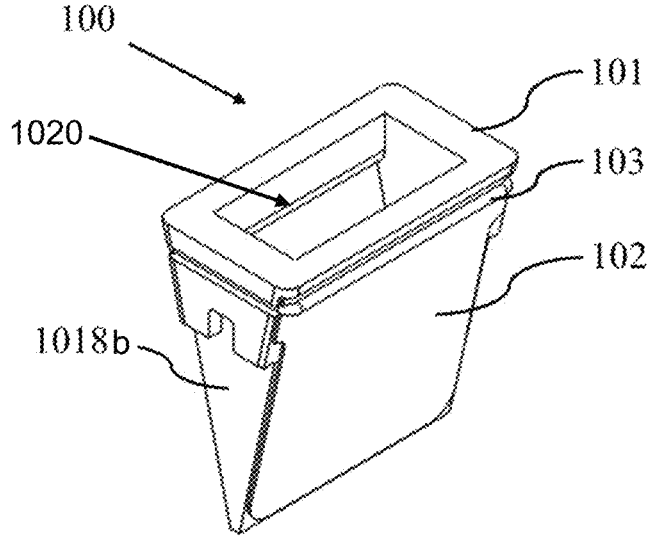
FIG. 3a illustrates a perspective view of a reed valve core, in accordance with an embodiment of the present disclosure.
Figure 3B:
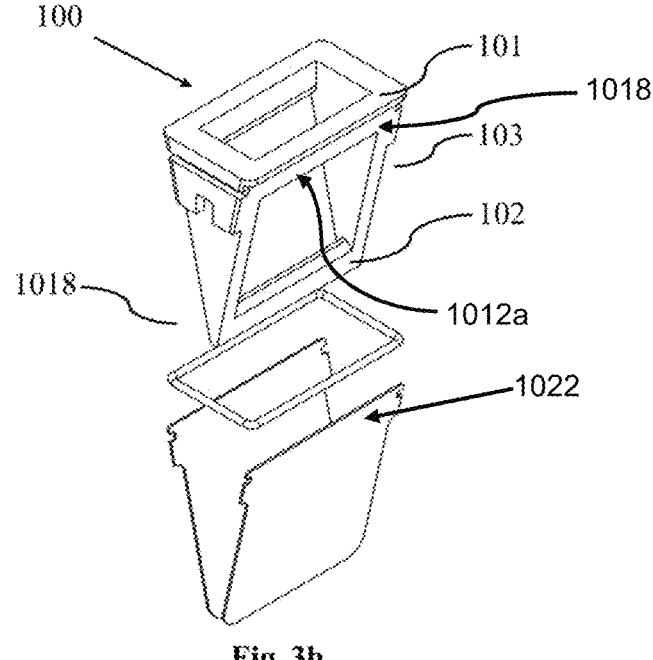
FIG. 3b illustrates an exploded view of the reed valve core of FIG. 3a, in accordance with an embodiment of the present disclosure.
Figure 3C:
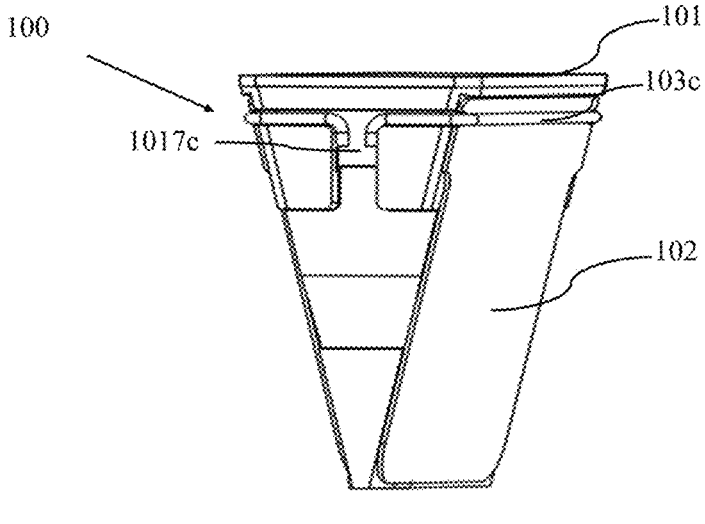
FIG. 3c illustrates a perspective view of a reed valve core with a non-continuous securing band, in accordance with an embodiment of the present disclosure.

Another embodiment of the reed valve core 100 is depicted in FIGS. 3a-c and shows a preferred configuration used in a reed valve assembly for replacing the conventional compressor valves shown in FIG. 1. In this embodiment, two sidewalls 1018 have a fluid outlet 1015 positioned therein and in fluidic communication with the fluid inlet 1011a in the top wall 1011. The sidewalls 1018 that lack fluid outlets 1015 serve to provide structure and to define an interior space 1020 to the reed cage 101. With the reeds 102 open, the fluid enters the reed cage 101 through the fluid inlet 1011a and exits the reed cage 101 through the fluid outlets 1015 in the sidewalls 1018 of the reed cage 101.

The reed 102 is securely attached to the top portion 1012a of the sealing face 1012 of the reed cage 101 by means of a securing band 103. The securing band 103 goes across the reed 102 making approximately a line contact with it and firmly clamping it to the top portion 1012a of the sealing face 1012. This line contact defines a bending axis about which the reed 102 is free to bend away from the sealing face 1012, thereby uncovering the fluid outlets 1015 and allowing fluid to flow through the reed valve core 100. The reed 102 is generally in a closed position unless a pressure differential forces it to open. During operation, the reed 102 will open when the pressure in the inlet region 1 is higher than the pressure in the outlet region 2. This pressure differential will exert a force on the reed 102 to bend it open. When the pressure differential in the outlet region 2 is equal to or higher than the pressure in the inlet region 1, the stiffness of the reed 102 returns it to the closed position and does not allow any fluid to flow through the reed cage 101. The top portion 1023 of the reed 102 may have cutouts 1021 extending thereinto, aligned with the bending axis of the reed 102, and into which the securing band 103 will fit upon assembly.

By using a securing band 103 to secure the reeds 102 to the reed cage 103, each reed valve core 100 can be used as independently and does not need a valve seat 201 in a reed valve assembly 200 to keep the components together. When a valve seat 201 must be used in conjunction with a reed valve core 100, as in the case of in prior art reed valves, it adds additional clearance volume or dead space to the application, as, for example, a discharge valve in a compressor. With small compressors or high pressure-ratio compressors, this additional clearance space will adversely affect the volumetric efficiency of the cylinder, thereby reducing the performance of the compressor. By using the reed valve core 100 of this disclosure in valve assemblies 200 that do not need a valve seat 201, the performance of the compressor can be improved. In fact, in some of these applications, a valve having a removable module cannot be used unless the reed valve core 100 has 102 reeds secured to the reed cage 101 by means of a securing band 103.

The securing band 103 is typically made of wire-like material that is shaped to envelope the reeds 102 and clamp it firmly to the reed cage 101 along the top portions 1012a of the sealing faces 1012. The securing band 103 can be continuous as shown in FIGS. 2a-2c and 3a-3b, or they can have ends that do not meet, as shown in FIG. 3c. In this embodiment, the ends of the wire are bent and are restricted from moving by positioning it in a notch 1017c on the sidewall 1018 of the reed cage 101. This allows the securing band 103c to be assembled easily while preventing it from pulling apart during operation. If the securing band 103c is sufficiently stiff, the ends do not need to be bent and restricted, as shown in FIG. 3c.

A securing band 103 that is continuous can be made by forming a wire to the correct shape and connecting its ends by means of a weld, adhesive or some other means. A cross-section of the wire could be round as shown in the embodiment of the securing band 103b in FIG. 3, rectangular as shown in the embodiment of the securing band 103a in FIG. 2, or non-uniform. The securing band 103 could be punched out from a sheet of the appropriate material of the required thickness. It also could be molded from plastic or metal using injection molding or similar processes.

The securing band 103 possesses the required tensile strength and the ability to maintain that strength at the temperature of operation of the valve. During operation, the reed 102 is subject to differential pressure between its two sides that creates a force that pushes the reed 102, attempting to open it and allow flow through the valve. The securing band 103 must be strong enough and stiff enough to prevent a top portion 1023 of the reed 102 from separating from the sealing face 1012 to which it is attached, allowing the reed 102 only to bend about the bending axis that is defined by the securing band 103. Therefore, every time the reed 102 opens due to differential pressure, stresses are induced in the securing band 103. The stress in the securing band 103 becomes zero when the reed 102 closes. Therefore, the securing band 103 is subject to fatigue loading and must be of a material that can withstand this, while also being of a low profile or compact.

In an example, these valves may be used in applications where the temperature of the fluid can get very high, above 300° C. Therefore, the material of the securing band 103 has to be chosen to work under the required temperature conditions. Similarly, in valves used in cryogenic applications, the temperature of the fluid can be below 180C, and the material of the securing band 103 has to be chosen accordingly. By using a securing band 103 that is used to attach the reeds 102 to the reed cage 101, a material can be chosen with no compromises, unlike in conventional reed valves where the reeds 102 are attached to the reed cage 101 by means of a rigid retainer that also needs to serve the function of a flange or housing. Housings that are used to secure the reeds 102 that also function as reed stops are compromised as the reed stop material ideally needs to be resilient and soft to absorb impacts, which goes counter to the requirements of a material to secure the reeds 102.

The securing band 103 should have elasticity so that the reed valve core 100 can be assembled economically. During assembly, the securing band 103 needs to be expanded over the reeds 102 and the sidewalls 1018 of the reed cage 101 and needs to snap back to firmly hold the reeds 102 to the reed cage 103. The use of the securing band 103 eliminates the requirement for threaded fasteners to attach the reeds 102 to the reed cage 101 as is typically done in conventional reed valves. This makes manufacturing reed cores 100 using securing bands 103 less expensive than manufacturing conventional reed valves. Further, the quality of the operation is improved as the force of attachment with the securing band 103 is always the same and is independent of the torque that needs to be applied on every fastener in the case of conventional reed valves.

Further, the securing band 103 is a more reliable and failure resistant mode of attaching the reeds 102 to the reed cage 101. It avoids the possibility of threaded fasteners backing out in a high vibration environment, which is typical of valve applications. In a prior art, where the reeds 102 were attached to the reed cage 101 by exerting a downward force against the reed cage 101 using a seat 201 in a reed valve assembly 200, to force the reeds 102 against the walls of a housing to get the required clamping force, the downward force must be controlled within a very tight range. If this force were too high, the clamping force would get too high and exert high stress in the housing causing it to fail. If the force is not high enough, the reeds 102 would not be secured properly to the reed cage 101 leading to leakage and failure.

In the embodiments of the reed valve core 100 shown in FIGS. 2 and 3, the securing band 103 sits in grooves 1013 in the sidewalls 1018 of the reed cage 101 and passes through notches 1021 cut out of the sides of the top portion 1023 of the reeds 102. This firmly secures the securing band 103 to the reed cage 101 and the reeds 102 to the reed cage 101. This means of positive engagement of the securing band 103 with the reed cage 101 and the reeds 102 ensures that there is no relative movement of the reeds 102 with respect to the reed cage 101 during assembly of the reed valve cores 100 in a reed valve assembly 200, machine or component thereof or during operation, unlike in prior reed valves using removable modules.

FIGS. 4a-4d are different embodiments of a rib cage 101, with four sidewalls 1018 of which two of the sidewalls 1018 have been configured as sealing faces 1012 according to this disclosure. These are preferred embodiments of the reed cage 101 for use in compressor applications replacing the conventional valves in FIG. 1a-1c.

These reed cages 101 have a top wall 1011 having a fluid inlet 1011a positioned therein. Two sidewalls 1018 are configured as sealing faces 1012, each sealing face 1012 surrounding the periphery of the fluid outlet1015 on this surface. The fluid outlets 1015 on each sealing face 1012 are in fluid communication with the fluid inlet 1011a on the inlet surface 1011 of the reed cage 101.

Figure 4A:
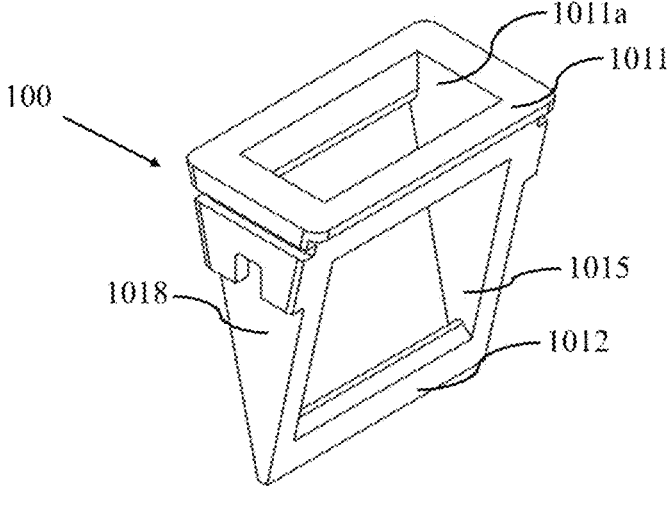
FIG. 4a illustrates a perspective view of an embodiment of a reed cage, in accordance with an embodiment of the present disclosure.

The reed cage 101 embodiment of FIG. 4a is typical of one used in relatively low-pressure differential applications. There is one large fluid outlet 1015 on each sealing face 1012. When the reed 102 is in the closed position in a reed valve core 100 using this reed cage, the reed 102 will be supported by the walls of the sealing face 1012. This reed cage 101 can be used in applications where the reed 102 will not buckle into the fluid outlet 1015 on the sealing face 1012 due to the pressure differential acting on the reed 102 during operation.

Figure 4B:
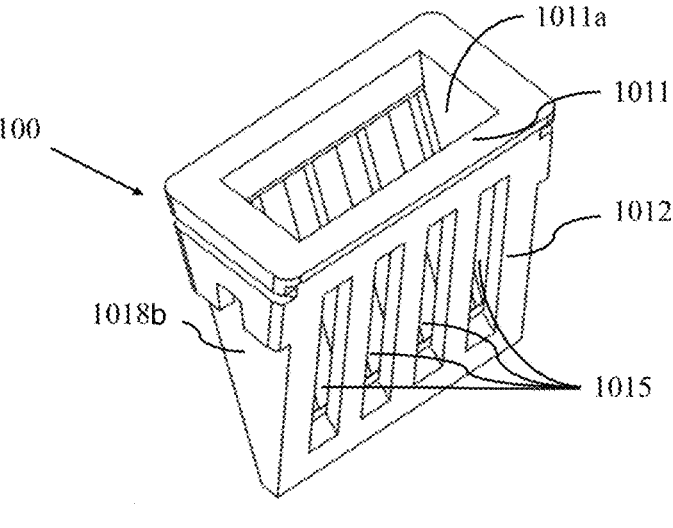
FIG. 4b illustrates a perspective view of another embodiment of a reed cage, in accordance with an embodiment of the present disclosure.
Figure 4C:
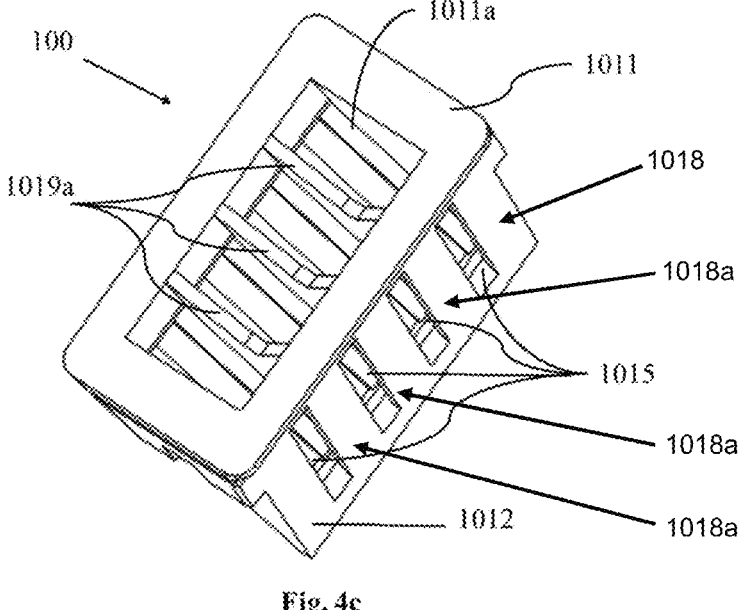
FIG. 4c illustrates a perspective view of another embodiment of a reed cage, in accordance with an embodiment of the present disclosure.

For higher pressure differential applications, the reed cage 101 shown in FIG. 4b can be used. The pressure differential in this application would have caused the reed 102 to buckle into the fluid outlet 1015 of the reed cage 101 shown in FIG. 4a. To prevent this, the sealing faces 1012 have equally spaced cut outs of the same width. Each of the cut out is a fluid outlet 1015 on the sealing face 1012. The width of the fluid outlets 1015 is such that the reed 102 will not buckle into the opening 1015 when subject to the application differential pressure, in its closed position. The thickness of the wall of the sealing face 1012 is designed to support the reed 102 in its closed position. Therefore, the reed 102 is supported by the wall of the sealing face 1012 when it is in the closed position.

In an application where the pressure differential is higher than can be supported by the walls of the sealing face 1012 of the reed cage 101 with fluid outlets 1015 cut out into it, as shown in FIG. 4b and described above, the reed cage 101 shown in FIG. 4c is used. In this reed cage 101, the walls of the sealing face 1012 between two fluid outlets 1015, are further reinforced by thin ribs 1019a, the ends of which are flush with the inner surface of the sealing face 1012 wall and positioned equidistant from the edges of the two fluid outlets 1015 on either side of it. The reed 102, is supported by the sealing face 1012.

The use of thin ribs 1019a, much thinner than the spacing between the edges of adjacent fluid outlets 1015, on the sealing face 1012, is crucial to minimize the flow losses within a valve. With lower flow losses, the greater the power consumption of the compressor valve, machine or component thereof that the valve is used in. The presence of ribs 1019 within the interior space 1020 of the reed cage 101, acts as a resistance to the flow of fluid through the reed cage. This results in a pressure drop in the fluid as it travels through the valve, which relates to losses and higher power consumed. Conventionally, the exposed ends of transverse ribs supported the reeds 102 directly. However, this design requires the fluid outlet 1015 width to be defined by the spacing between the ribs, which in turn requires the ribs to be thick enough to properly define the width fluid outlet 1015 to prevent the reed 102 from buckling into the fluid outlet 1015. The thick ribs add a high amount of resistance to the flow of fluid through the reed cage 101, resulting in high valve losses and power consumption. The use of thickened sealing face 1012 walls, with fluid outlets 1015 of the correct width cut out in it, with the walls between the edges of two adjacent fluid outlets 1015 supported by a thin rib 1019, drastically reduces the resistance to flow and the power consumption of valves of this disclosure used in these applications. The reeds 102 are supported by the sealing face 1012 wall in its closed position against the application pressure differential.

Figure 4D:
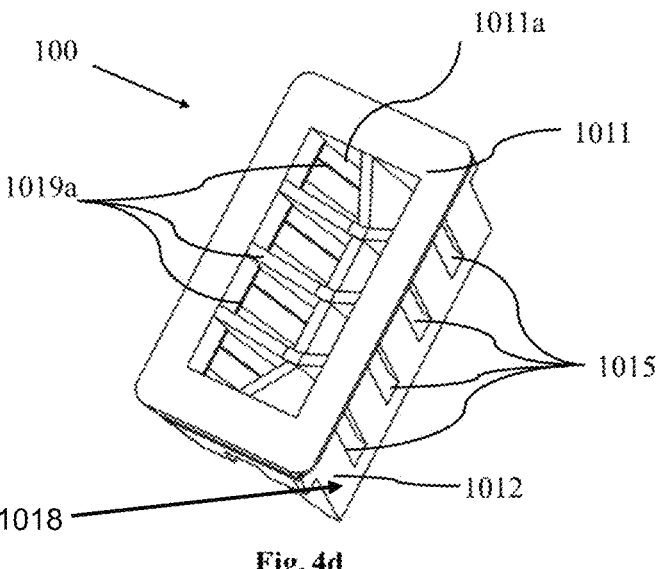
FIG. 4d illustrates a perspective view of another embodiment of a reed cage, in accordance with an embodiment of the present disclosure.

A lateral rib is generally not required in valves of this disclosure. For example, the reed valve core shown in FIG. 2a-2c with a single sealing face 1012 can be applied in very high pressure-differential applications using only transverse ribs 1019a as described in the paragraph above. However, in embodiments as shown in FIG. 3a-3c, with two sealing faces 1012 opposite each other, with end sidewalls 1018b, that have a wide span, optimization has to be done to determine whether this specific embodiment of the reed valve core 100 can be used by only thickening the end sidewalls 1018b, or whether there would be less resistance to flow through the reed core 100, by reducing the thickness of the end sidewalls 1018*b* and reinforcing it with a rib, which in the case of the embodiment in FIG. 3*a*-3*c* would be a lateral rib 1019*b*. For such high pressure-differential applications where an embodiment of the reed valve core 100 as shown in FIGS. 3*a*-3*c* has to be used. FIG. 4*d* shows an embodiment of the reed cage 101, with a single transverse rib 1019*b*, that travels across the interior space 1020 of the reed cage 101, reinforcing two of the sidewalls 1018.

Detailed analysis of several configurations of reed cages 101 using ribs to reinforce the sidewalls 118 having sealing face 1012 walls and/or the end sidewalls 1018*b*, has shown that by using a unique configuration of the ribs, where the end of the ribs supporting the wall goes to the top of the wall as required to support it, the top edge of the rib should quickly fall below the level of the start of the fluid outlets 1015 on the sealing faces 1012 and maintain that height. The top edge of the rib would make an angle of 30 to 60 degrees with the sidewall it supports before coming to the height below the beginning of the fluid outlets 1015 in the sidewalls having sealing faces. This configuration of the ribs provides the least resistance to flow of fluid through the reed cage while providing adequate support to the sidewalls.

The decision to use ribs to reinforce a reed cage 101 depends on a number of factors. The strength of material of the reed cage 101 determines whether the sidewalls of the reed cage alone are sufficient to support the pressure differential of the application. It also determines how thin the sidewalls can be made, whether the reed cage 101 is supported by ribs or not. The cost of manufacturing and therefore the cost of the valve determines the choice of the material used. The conditions of the application that the valve is used in-whether it requires special materials that are resistant to corrosion or resistant to abrasion, whether the material has to operate at high temperature may dictate the choice of the material rather than its strength. Once a material has been determined, it is now necessary to optimize the design to minimize the number of ribs used in order to maximize efficiency or reduce losses and reduce the power consumed, always keeping in mind the cost of manufacturing the final part. Typical material used for the reed valve core 100 are plastics such as nylon, PPS and PEEK, reinforced plastics, and metals such as steels, stainless steel, aluminum, Inconel, etc.

Figure 5A:
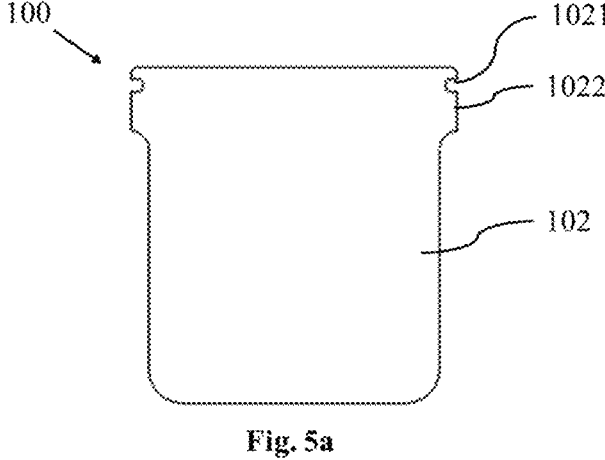
FIG. 5a illustrates a front view of an embodiment of a reed, in accordance with an embodiment of the present disclosure.
Figure 5B:
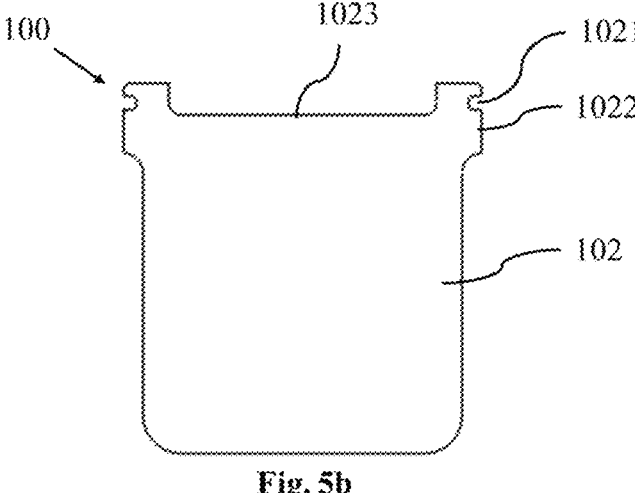
FIG. 5b illustrates a front view of another embodiment of a reed, in accordance with an embodiment of the present disclosure.

FIG. 5*a* and FIG. 5*b* shows a front view of two embodiments of a reed 102 that is used with a reed valve core 100. These embodiments of the reed 102 has two notches 1021, one at either end of the top portion 1023 of the reed 102. These notches 1021 are used to secure the reed 102 to a sealing face 1012 of a reed cage 101 in a reed valve core 100 using a securing band 103. The securing band 103 passes through the notches 1021 locking it in place with the securing band 103. Doing so, the reed 102 will not be able to move up or down relative to the securing band 103 during operation.

As explained earlier, the securing band 103 goes across the reed 102 making approximately the line contact with it and firmly clamping it to the top portion 1012*a* of the sealing face 1012 that the reed 102 operates on. This line contact defines the bending axis about which the reed 102 is free to bend away from the sealing face 1012 thereby uncovering the exit openings 1015 on the sealing face 1012 and allowing fluid to flow through the reed valve core 100. When the pressure differential in the outlet region is equal to or higher than the pressure in the inlet region, the stiffness of the reed 102 returns it to the closed position and does not allow any fluid to flow through the reed cage 101. During operation, the reed 102 bends open and closes several times. The greater the deflection of the reed 102 at its lower edge, the greater will be the bending stresses in the reed 102 and these stresses are a maximum along its bending axis. This opening and closing of the reed 102 during operation results in fatigue of the material along the bending axis and a typical mode of failure of the reed 102 is to fail along its bending axis. In conventional reed valves, when a reed 102 fails due to bending, the failed piece may fall into the machinery that the reed valve 200 is operating in, causing extensive damage.

According to an embodiment, the top portion 1023 of the reed 102 may be wider than the rest of the reed 102 resulting in protrusions 1022 extending bilaterally from the reed 102. The notches 1021 on either side of the reed 102 for securing the reed 102 are within these protrusions 1022 with the protrusions 1022 extending well below the notches 1021. The position of the notches 1021 defines the bending axis along which the reed 102 could fail due to fatigue during operation. By having these protrusions 1022 on the reed 102, the top portion 1023 of the failed part of the reed 102 is wider than the rest of the reed 102 and is designed to be caught by the end walls of a carrier 203 in a reed valve assembly 200 or the transverse ribs 2023 in a guard 202 of a reed valve assembly 200. This feature of the reed 102 prevents, upon failure, the broken piece of it from falling into the machinery that the reed valve assembly 200 is used in that would cause extensive damage.

FIG. 5*b* shows an embodiment of a reed 102 where there is a cutout 1021 along the top portion 1023 that extends across the bending axis of the reed 102, whereas FIG. 5*a* shows an embodiment of a reed 102 without a cutout. For a given reed 102, the amount of material along the bending axis determines the stiffness of the reed 102, with a higher stiffness when there is more material. By providing the cutout 1021 as shown in FIG. 5*b*, the stiffness of the reed 102 can be varied based on the amount of material removed. The reed valve core 100 of a reed valve assembly 200 has to be designed tailoring the stiffness of the reed 102 to the application that it is used in. In conventional reed valves 200, the reed 102 stiffness varies by changing the thickness of the reed 102, that is, the reed 102 had to be punched out of a different sheet of material. Reeds 102 of several thicknesses may have to be made for different applications. By providing cutouts 1021 of different widths, the reed 102 of the same thickness can be used in several applications that makes the cost of manufacturing and cost of inventory lower. Further, a reed 102 that is thicker can withstand a higher pressure-differential. By using cutouts 1021 in a reed 102 that is thicker, it can be used in applications where a reed that is thinner may have the required stiffness but may not be able to withstand the application pressure differential.

The description of the embodiments of reed valve cores 100 shown in FIGS. 2*a*-2*c* and 3*a*-3*c* are illustrative and should not be construed as limiting the scope of the present disclosure. The reed cage 101 can be made of a square cross-section with four sidewalls 1018 and with each sidewall 1018 configured to be a sealing face 1012 with at least one reed 102 covering each sealing face 1012. Each sealing face 1012 may be covered by one or more reeds 102, secured to the sealing face 1012 by the same securing band 103, in order to provide the correct stiffness and mass of the reeds 102 for the given application. Reed cages 101 may have 3 side faces or may have a cross-section of any polygon with one or all of the sidewalls 1018 being configured as a sealing face 1012. In practice, either a hexagon or any polygon with sides lesser than a hexagon can be used as a reed cage 101.

In the embodiment of the reed valve core 100 shown in FIGS. 2a-2c and 3a-3c, the reed cage 101 has shoulders 1014 on the sidewalls 1018. These shoulders 1014 are used to hold the reed valve core 100 in a reed valve assembly 200, machine or component thereof. The force acting on the reed valve core 100 due to pressure differentials during operation, is transmitted through these shoulders 1014 to the external structure holding it. The top surface or/and the bottom surface of the shoulder 1014 can be used to hold the reed valve core 100 in an external assembly. The description of the particular embodiment is illustrative and should not be construed as limiting the scope of the present disclosure. For example, in the case of a reed cage 101 that is polygonal in cross-section with all the sidewalls 1018 configured as sealing faces 1012, the shoulders 1014 are projections of the edges or corners of the sealing faces 1012 of the reed cage 101 that are made to protrude outwards as required to serve the function of the shoulders 1014.

Figure 6A:
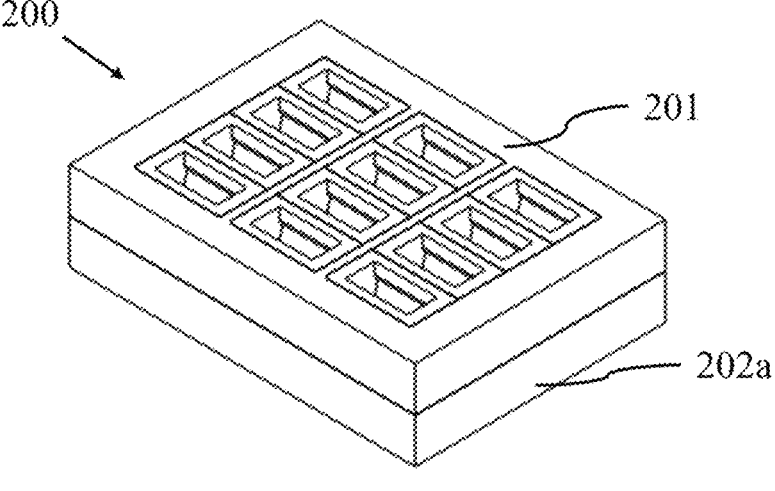
FIG. 6a illustrates a perspective view of a reed valve assembly, in accordance with an embodiment of the present disclosure.
Figure 6B:
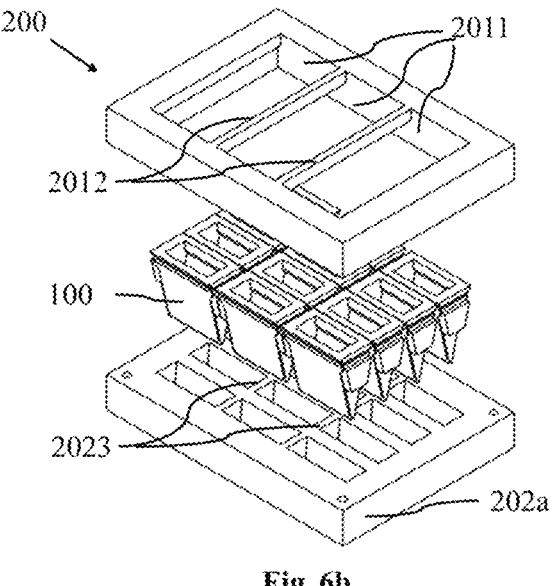
FIG. 6b illustrates an exploded view of the reed valve assembly, in accordance with an embodiment of the present disclosure.
Figure 6C:
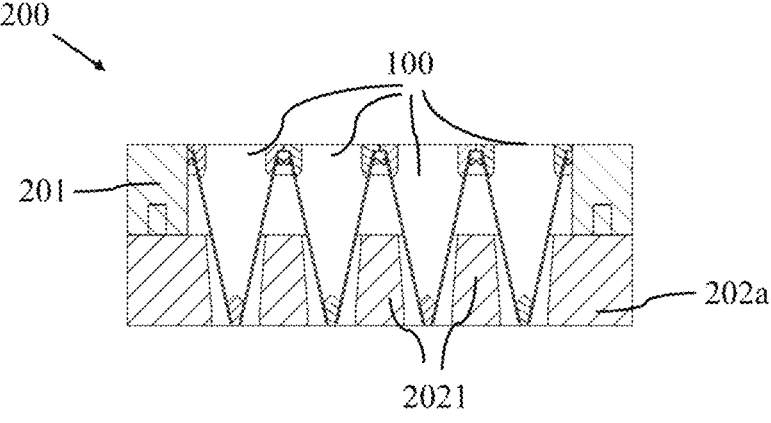
FIG. 6c illustrates cross-sectional view of the reed valve assembly, in accordance with an embodiment of the present disclosure.

FIG. 6a illustrates a perspective view of the reed valve assembly 200, FIG. 6b is a perspective exploded view of the reed valve assembly 200, and FIG. 6c is a cross-sectional view of the reed valve assembly 200. The reed valve assembly 200 is a one-way valve that only allows flow to move from the inlet side to the outlet or discharge side. When the pressure in the inlet region is higher than that in outlet region, the reeds 102 of the reed valve core 100 open and allow the flow from inlet region to outlet region. When the pressure in outlet region is equal to or higher than the pressure in inlet region, the pressure differential, in conjunction with the stiffness of the reeds 102, causes the reeds 102 to close, preventing any back flow through the reed valve assembly 200.

The reed valve assembly 200 includes reed valve cores 100 captured between a valve top plate 201 and a valve guard plate 202a. In many embodiments of the reed valve assembly 200, one or more guards 202 may be combined and integrated into a single guard plate 202a, that makes assembly/disassembly of the valve easier and may reduce the cost of the reed valve assembly 200 relative to one that has multiple, individual guards 202 and provides a means to attach the guards to the top plate 201 by some fastening means. The specific embodiment of the guard plate 202a shown in FIG. 6a-6c is made with multiple guards 202 machined as one piece along with the frame of the guard plate 202a. Typically, the guard plate 202a, or individual guards 202, are attached to the top plate 201 by means of a removable fastening mechanism such as threaded fasteners, retaining clips, snap-fit mechanisms, etc. The terms guard 202 or guard plate 202a will imply a similar technical meaning and thus have been used interchangeably throughout the description.

In this embodiment of a reed valve assembly 200, each reed valve core 100 is captured on the top and bottom surfaces of the shoulders 1014 of its reed cage 101 by the transverse ribs on the top plate 2012 and the transverse ribs on the guard plate 2023. These ribs support the reed valve cores 100 in the reed valve assembly 200 and keep them in place when subject to forces due to the pressure differential acting on the valve 200. There may be a locking mechanism between the shoulder of the reed cage 101 and the rib engaging with the shoulder, either the rib on the top plate 201 or the rib on the guard 202 or both, that positions the reed valve core 100 precisely in the reed valve assembly 200. For example, this locking mechanism could be a combination of a protuberance and a slot in the shoulder of the reed cage 101 and the rib that engages with it. There are openings 2011 between the ribs 2012 of the top plate that allow the top wall 1011 of the reed valve cores 100 to be exposed to the fluid on the inlet side of the reed valve assembly 200.

Also in this embodiment of the reed valve assembly 200, there is no structure above the top wall 1011 of the reed valve cores 100 as would be the case if the top plate were configured with a seating surface against which the top wall 1011 of the reed cage 101 had to be seated in the reed valve assembly 200. The top walls 1011 of the reed valve cores 100 are flush with the top wall 1011 of the top plate 201. Therefore, the clearance volume of this reed valve assembly 200 used as a discharge valve in an application is the lowest clearance volume possible. Hence, this is a desirable embodiment in applications where minimizing clearance volume is important.

The guard plate 202a shown in FIG. 6a-6c, comprising of a number of guards 202, has transverse ribs 2023 that hold the reed valve cores 100, and walls that are positioned adjacent to a lower portion of the reeds 102 of the reed valve core 100, keeping the upper portion of the reeds 102 free and open. In this embodiment, the inner surface of the guard walls 2021 are configured with a profile 2021a that engages with the lower portion of the reed 102 adjacent to it, to limit the extent to which the reed 102 can open. The profile 2021a of the guard wall 2021 is designed to minimize the impact force and hence the stresses in the reed 102 when the reed 102 opens violently during operation of the valve 200. The profiled guard wall 2021 is also referred to as a petal guard. The guard may have walls 2021 that are not profiled. It may have walls with vertical flat faces, with the objective of such a wall being to support a reed valve core 100 on its top surface, to restrict flow or for some other purpose other than to act as a petal guard. Walls are profiled only if they are adjacent to a reed 102 of a reed valve core 100.

In this disclosure, the upper portion of the reed 102, extending well below the securing band 103, is open, without any wall adjacent to it. This design feature allows valves of this disclosure to be used in a dirty gas environment where there may be dirt particles suspended in the gas that flows through these valves. In a conventional reed valve, where the petal guard wall 2021 is adjacent to the entire reed 102, including its upper portion, close to the bending axis of the reed 102, dirt particles can get pushed into the gap between the reed 102 and the guard wall 2021, preventing the reed 102 from bending along its designed bending axis, but instead forces it to bend along a new axis below the designed bending axis. This results in higher than design stresses being developed in the reed 102 that will cause it to fail along its new bending axis. The reed valve core 100 and the reed valve assembly 200 in this disclosure eliminates this mode of failure in dirty gas applications, making the valves of this design more reliable and preventing extensive damage to the machinery the valve is used in.

The embodiment of the present disclosure shown in FIG. 6a-6c may also represent a machine or a component thereof. In the case of a discharge valve of a compressor cylinder, for example, the top plate 201 of the reed valve assembly 200 could be an integral part of the cylinder. In the case of a suction valve of a compressor cylinder, the guard plate 202a, could be an integral part of the cylinder.

In all reed valve assembly 200 embodiments of this disclosure, the one or more reed valve cores 100 are captured within a reed valve assembly 200 between a top plate 201 and a guard 2021, with the guard 2021 being attached to the top plate 201 by means of a removable fastening method. When the top plate 201 is detached from the guard 2021, each reed valve core 100 in the reed valve assembly 200 can be removed and replaced independently of the other, if required.

The reed valve core 100 contains the elements in a reed valve assembly 200 that wear at a fast rate and needs to be maintained periodically. This includes the reed cage 101 and the reeds 102. The guards 2021 wear at a much slower rate than the reed cage 101 and the reeds 102. With reed valve cores 100 that are removable, the maintenance of valve assemblies 200 disclosed here is very simple and cost effective, as it involves the replacement of only those reed valve cores 100 that have worn out. There is no machining involved and no need to replace components that are not worn out. In conventional valves, servicing of the valves requires machining of the valve seat 201 and guard plate 202a. The process is expensive and needs to be done in a precision machine shop after inspection of these components to make sure that there is sufficient material is present so that they can be machined. Once these components have been machined multiple times, they have to be discarded. Hence the valve seat 201 and valve guard plate 202a of conventional valves, which are the most expensive part of the valve, are consumable. In conventional reed valves, if there is any wear on the reed cage 101, the entire valve must be discarded. Reed valves with modules force the user to discard the petal guard housing along with the reed cage 101 and reeds 102 although it may not be worn. Therefore, the cost of maintenance of these valves is more than that of the valves presented in this disclosure.

Figure 7A:
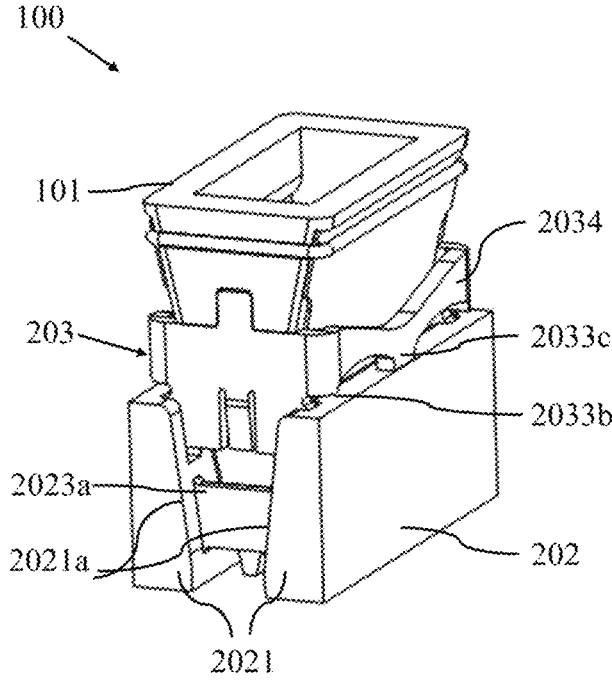
FIG. 7a illustrates a perspective view of a reed valve core positioned on a reed guard along with a carrier, in accordance with an embodiment of the present disclosure.
Figure 7B:
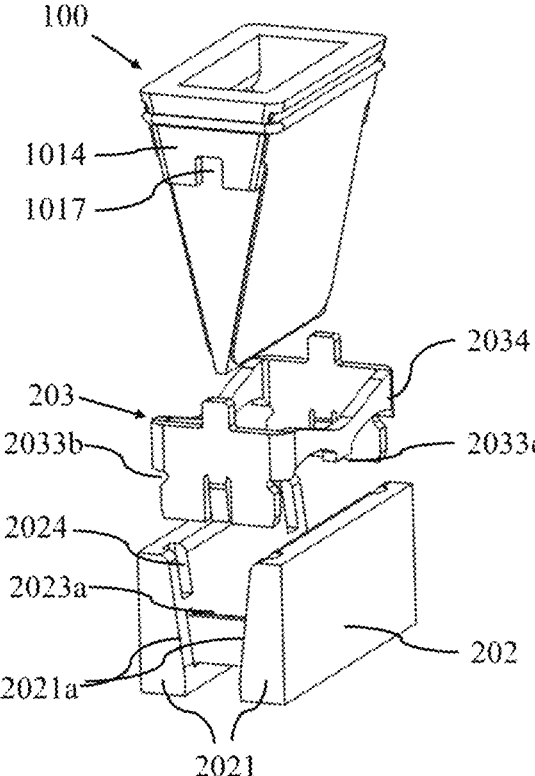
FIG. 7b illustrates an exploded view of the reed valve core positioned on a reed guard along with a carrier, in accordance with an embodiment of the present disclosure.

FIG. 7 illustrates two views of a reed valve core 100 positioned on a reed guard 202 along with a carrier 203, in accordance with the present disclosure. FIG. 7a is a perspective view, while FIG. 7b is an exploded view of FIG. 7a. A single reed valve core 100, inserted into a carrier 203, that is seated on a guard 202 is shown for illustrative purposes. This figure may also represent how one reed valve core 100 of many, is positioned on a section of a guard 202, using a carrier 203, in a reed valve assembly 200, machine or component thereof.

The guards 202 may have transverse ribs 2023 that increase their rigidity and may also prevent the reed valve cores 100 from moving out of position in the event that an adjacent core 100 fails during operation and exits the reed valve assembly 200. The distance between two transverse ribs 2023 may also be spaced to trap failed reeds 102 at the wider portion 1022 of the reed 102 and prevent it from exiting the reed valve assembly 200, preventing damage to the machine that the reed valve assembly 200 is installed in. In some embodiments of the reed valve assembly 200, the shoulders 1014 of the reed valve cores 100 may engage directly with the transverse ribs 2023, thereby supporting the reed valve core 100 without the use of a carrier. It is not difficult for a person of skill to design a transverse rib 2023 of a guard 202 that deflects in a controlled manner when the reed valve core 100 pushes down against it, thereby providing all the features of a carrier with structure that deflects 2034, as explained in the following paragraphs.

As illustrated, the guard wall 2021 is a reed-stop wall as it includes a profile 2021a for restricting the movement of the reed (e.g., reed 102 of FIG. 8) at a lower portion. The carrier 203 is used to hold the reed valve core 100, within a reed valve assembly 200, machine or components thereof, so that the reeds 102 of the reed valve core 100 are positioned properly with respect to the guard walls 2021. The guard walls 2021 in this embodiment of the guard 202 has a profile 2021a that acts on a lower portion of the reeds 102 of the reed valve core 100, to limit its opening and therefore the impact velocity of the reeds 102, thereby improving the life and reliability of the reed valve core 100.

In this embodiment of the reed valve core 100 and the carrier 203, a slot 1017 in the shoulder 1014 of the reed cage 101 engages with a projection 2032 on an end wall of the carrier 203, locking the reed cage 101 in a transverse direction with respect to the carrier 203, and positioning the reed valve core 100 in the carrier 203. In this embodiment, the carrier 203 end walls interface with the reed cage 100 to prevent it from moving in the lateral direction with respect to the carrier 203. In another embodiment of the present disclosure, the reed valve assembly above may further comprise a backing plate that configured to further secure the snap-fit guard to the top plate using fastening means.

In another embodiment of the present disclosure, the valve assembly may comprise of an adapter configured to be inserted into the guard. The adapter comprises a reed stop wall that it configured to engage with the lower portion of the reed of the reed valve core, leaving the top portion of the reed open.

The carrier 203 has surfaces 2033b and 2033c that seat the carrier 203 with core 100 on the top surface of the guard wall 2021 restricting its vertical motion in a reed valve assembly 200. A structure 2033a on the walls of the carrier 203 engage with notches 2024 in the guard wall 2021 to lock the carrier 203 in both the transverse and lateral directions and to position the reed valve core 100 such that the reeds 102 of the reed valve core 100 are positioned adjacent to and at the prescribed distance from the guard walls 2021. By locking the reed valve core 100 in the carrier 203 and the carrier in the guard 202, the reed valve core 100 is essentially locked in the correct position in the reed valve assembly 200.

The carrier 203 can be locked to the reed valve core 100, by a mechanical means such as a snap-fit mechanism or by using an adhesive, weld or some other fastening method, depending on the material of the carrier 203 and the reed cage 101. It is also feasible to make the carrier 203 and the reed cage 101 of the reed valve core 100 as one piece. In these cases, the carrier 203 would be an integral part of the reed valve core 100. The carrier 203 can also be locked to the guard 202 by a fastening means so as to receive an independently removable reed valve core 100. With more advanced manufacturing methods, it is possible to integrate the guard 202 and the carrier 203 into a single guard plate 202a. A preferred embodiment of the carrier 203 is one where it is an independent component with the means to fasten it removably to the reed valve core 100, or to the guard, or to both.

Locking the reed valve core 100 in the reed valve assembly 200 so that it cannot move in any direction has the benefit that, in the case of failure of the reed valve assembly 200 during operation, where one or more reed valve cores 100 fail and escape the reed valve assembly 200, the reed valve cores 100 that remain in the assembly cannot move and hit against each other and with the walls of the valve housing causing them to fail quickly. Therefore, the operation of the machine can be prolonged and the decision to shut the machine down to make the repairs can be taken later. Therefore, this feature improves the running time of machines using this feature.

In a preferred embodiment of the present disclosure, the carrier 203 may have a structure 2034 that provides a controlled deflection/stiffness to the reed valve cores 100 when the reed valve cores 100 are assembled in the reed valve assembly 200 on carriers 200 with this structure. In the embodiment of the carrier in FIG. 7, the structure 2034 has two surfaces 2033b and 2033c, that are not on the same plane, that seat the carrier 203 on the top of the guard wall 2021. FIG. 7*a* illustrates how the surface 2033*c* of the structure 2034 is in contact with the top surface of the guard wall 2021. The surface 2033*b* does not touch the top surface of the guard wall 2021, rather, it is separated by a gap. The structure 2034 is designed such that the reed valve core 100 can be pushed down over the length of this gap until the surface 2033*b* comes into contact with the top surface of the guard wall 2021. Doing so, deforms the carrier structure 2034 that resists this deformation with a force proportional to the distance that the reed valve core 100 is pushed down.

This unique structure 2034 of the carrier 203 provides various benefits including at least one of the following: accommodate thermal gradients between the reed valve core 100 and a housing of the reed valve assembly 200, accommodate differences in tolerance stack ups of the different reed valve cores 100 in a reed valve assembly 200, or to provide a defined gasket pressure between a top seating surface 2013 of the reed cage 101 and a seat face of the reed valve assembly 200 or machine, or component thereof.

The material of the reed valve cores 100 and that of the valve housing, the top plate 201 and guard 202 are typically different. The reed valve core 100 may be made mostly out of plastic and the valve housing mostly of metal. In applications where the reed valve assembly 200 is subject to a high or low temperature during operation, with respect to the assembly temperature, the reed valve cores 100 and the valve housings will expand or contract at different rates depending on the coefficient of linear thermal expansion of its material. Because the reed valve cores 100 are sandwiched between the top plate 201 and the guard 202, reed valve cores 100can either get compressed or become loose due to the differential expansion caused by temperature changes. This can lead to very high stress in the reed valve assembly 200 causing it to fail, or there could be a loss of gasket pressure between the reed cage seating surface 2013 and the top plate seating surface, causing the valve to leak and fail. By using a carrier 203 with this structure 2034, the differential expansion of the reed valve core 100 and the valve housing is managed without any issue.

When a plurality of relatively rigid reed valve cores 100 have to be held in place between a rigid top-plate 201 and a rigid guard 202, if the reed valve cores 100 are not exactly the same height, a high force is required to distort the high reed valve cores 100 to ensure that the top plate 201 and guard plate 202 contacts all the reed valve cores. The high reed valve cores 100 will be subject to a higher stress than the other reed valve cores 100 in the assembly 200. If the height of the reed valve cores 100are not within a very tight tolerance band, the stresses could increase to the point that one or more reed valve cores 100 fail. It is very expensive to manufacture all the reed valve cores 100 within a very tight tolerance. The ability of the embodiment of the carrier 203 with the structure 2034 to deflect allows the tolerance band to be much wider, reducing the cost of manufacturing the reed valve assembly 200.

Similarly, in embodiments where the top wall 1011 of the reed cage 101 is a seating surface that needs to form a leak free interface with a top surface of the top-plate 201 that has been configured as a seat in a reed valve assembly 200, the deflection and stiffness of the carrier 203 with the structure 2034 ensures that there is a constant gasket pressure between the seat of the reed cage 101 and that of the top plate 201, preventing leakage.

Figure 8A:
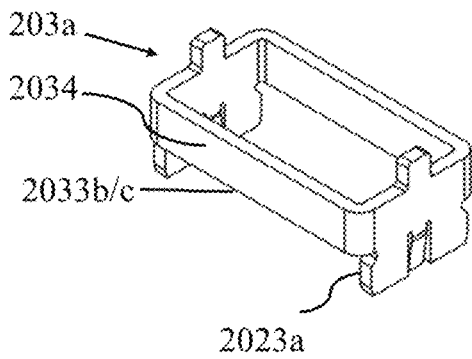
FIG. 8a illustrates a perspective view of an embodiment of a carrier, in accordance with an embodiment of the present disclosure.
Figure 8B:
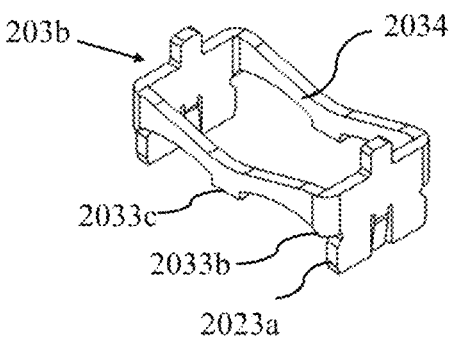
FIG. 8b illustrates a perspective view of another embodiment of a carrier, in accordance with an embodiment of the present disclosure.

FIG. 8 illustrates 3 embodiments of carriers 203 that are independent components, removable from the reed valve core 100 and/or the guard 202. FIG. 8*a* is a perspective view of an embodiment of a removable carrier 203*a*, where the structure 2034 is rigid and cannot be deflected. There is only one planar seating surface 2033*b/c* on the bottom of this structure that seats the carrier on the top surface of the guard wall 2021. Because this surface 2033*b/c* is planar, it cannot deflect. FIG. 8*b* is a perspective view of an embodiment of a removable carrier 203*b*, that is also shown in FIG. 7 and has been described in detail. This embodiment of the carrier 203*b* has the ability to deflect.

Figure 8C:
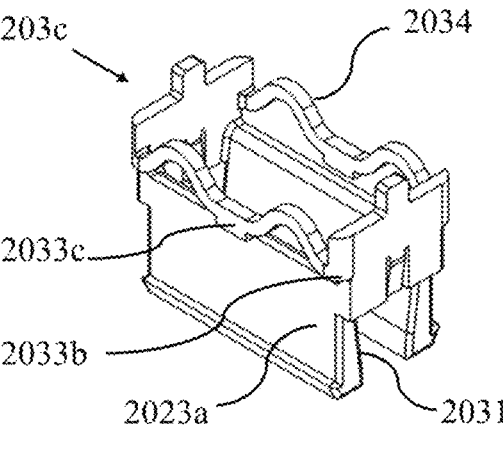
FIG. 8c illustrates a perspective view of another embodiment of a carrier, in accordance with an embodiment of the present disclosure.

FIG. 8*c* is a perspective view of an embodiment of a removable carrier 203*c*, that has a structure 2034 that allows the carrier 203*c* to deflect and incorporates reed stop walls 2031 integrated into the carrier. The reed stop wall 2031 has a profile that acts on a lower portion of the reed 102 adjacent to it. It has two functions to limit the opening of the reed 102 to a particular value known as "lift" and to cushion the reeds 102 opening impact velocity to minimize the stresses in the reed 102. As is shown in FIG. 7, when a reed valve core 100 is placed in a carrier 203, the top portions 1023 of the reeds 102 are open, without any walls adjacent to it. This carrier 203*c* with integrated reed stop walls 2031 is designed to be used with guards 202*b* where the guard walls 2021 do not have a profile 2021*a*, but instead, the walls are flat. This embodiment of the carrier 203*c* is shown with a snap-fit mechanism on the lower portion of its reed stop walls 2031 that snap-fit against the lower surface of the guard walls 2021 of the guard 202*b*, thereby converting it to a reed stop wall 2031. It should be noted here that in this embodiment, the entire back surface of the reed stop wall 2031 acts as the structure 2033*a* that locks the carrier 203 to the guard 202*b* in the transverse direction.

Figure 9:
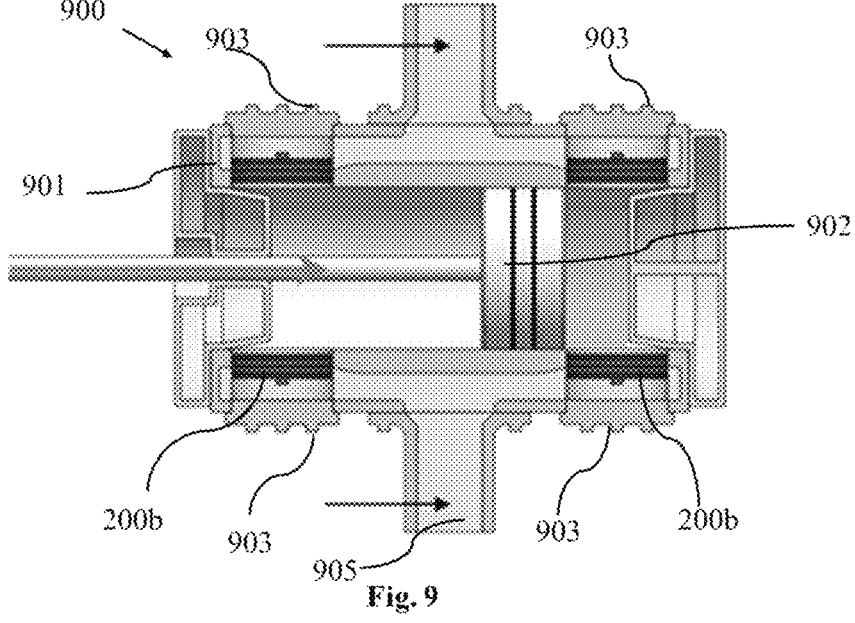
FIG. 9 illustrates a cross-sectional view of a double-acting reciprocating compressor cylinder.

FIG. 9 is a representation of a double acting reciprocating compressor cylinder assembly 900. This assembly 900 comprises of a piston 902 moving back and forth in a cylinder 901. In the case of a double acting compressor cylinder 901, the piston 902 compresses gas in front of it as it moves forwards and behind it as it changes direction. There are suction valves 200*a* that control the flow of gas into the cylinder from the suction line 904 and discharge valves 200*b* that control the flow of gas out of the cylinder into the discharge line 905. The valves are held in place in the cylinder by means of the valves caps 903 shown in FIG. 9. The cylinder assembly 900 takes in low pressure gas from the suction line 904, compresses it to the discharge pressure and pushes it into the discharge line 905. Here, the suction valves 200*a* only allow flow of gas from the suction line 904 into the cylinder 901 and the discharge valves 200*b* only allow the flow of gas from the cylinder 901 to the discharge line 905.

FIG. 10 represents an embodiment of a reed valve assembly 200*c*, in accordance to the current invention, that can be configured to be a suction valve 200*a* or a discharge valve 200*b* of a typical reciprocating compressor cylinder assembly 900 shown in FIG. 9. Reed valve assembly 200*c* is a direct replacement for the conventional valve assemblies shown in FIG. 1. The reed valve cores 100 of reed valve assembly 200*c* are located between the valve top plate 201*a* and the valve guard plate 202*a*, by the carriers 203, as is shown in FIG. 10*a*. The six reed valve cores 100 of reed valve assembly 200*c*, with individual carriers 203, are shown in FIG. 10*c*. In one embodiment, two fasteners 500, which may be threaded fasteners, are used to hold the valve guard plate 202*a* to the valve top plate 201*a*. It should be understood that the fasteners 500 may instead include a combination pin and retaining ring structure, snap fits, and other analogous structures and the term "threaded" is not intended to be limited to threaded fasteners. The openings 2011 is the valve top plate 201a are shown in FIG. 10d. FIGS. 10b and 10c show that each of the fluid openings 2011 on the top plate 201a is in fluid communication with the at least one fluid inlet conduit 1011a of the top wall 1011 of the reed valve core 100 adjacent to it in the reed valve assembly 200c.

Figure 10A:
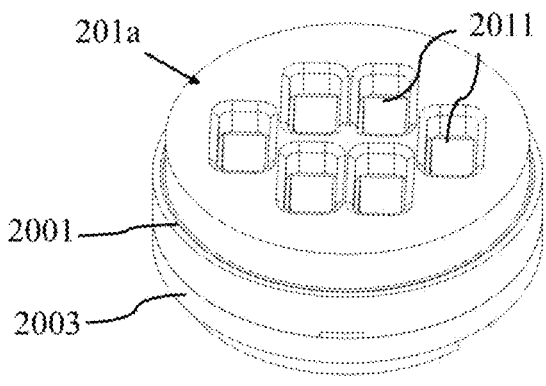
FIG. 10a illustrates a perspective view of a reed valve assembly, in accordance with an embodiment of the present disclosure.
Figure 10B:
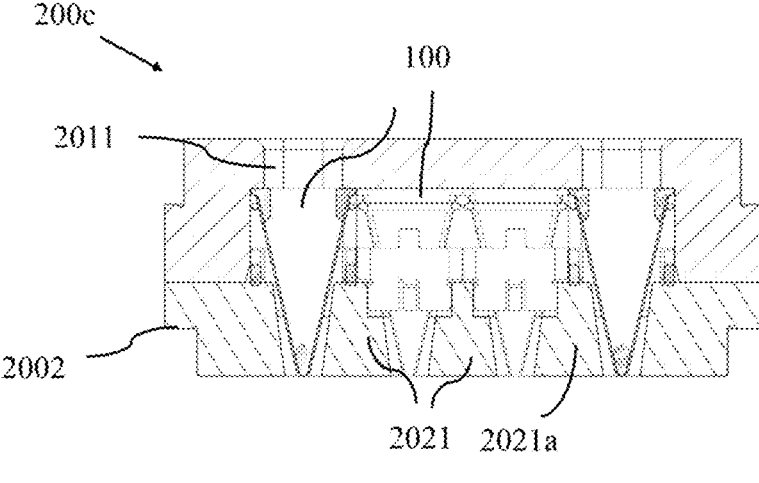
FIG. 10b illustrates a cross-sectional view of the reed valve assembly, in accordance with an embodiment of the present disclosure.
Figure 10C:
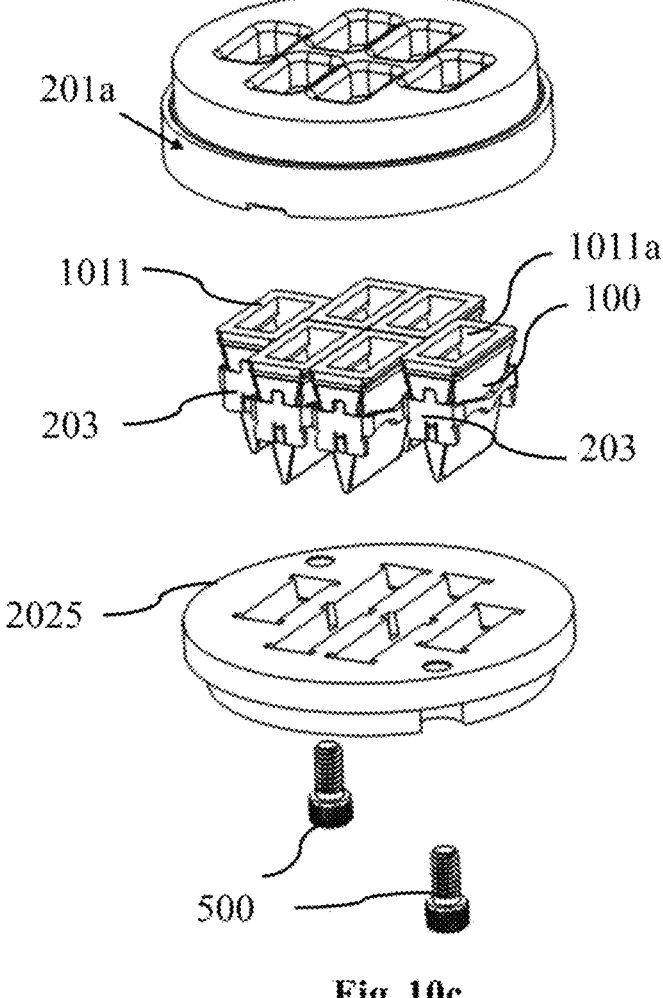
FIG. 10c illustrates an exploded view of the reed valve assembly, in accordance with an embodiment of the present disclosure.
Figure 10D:
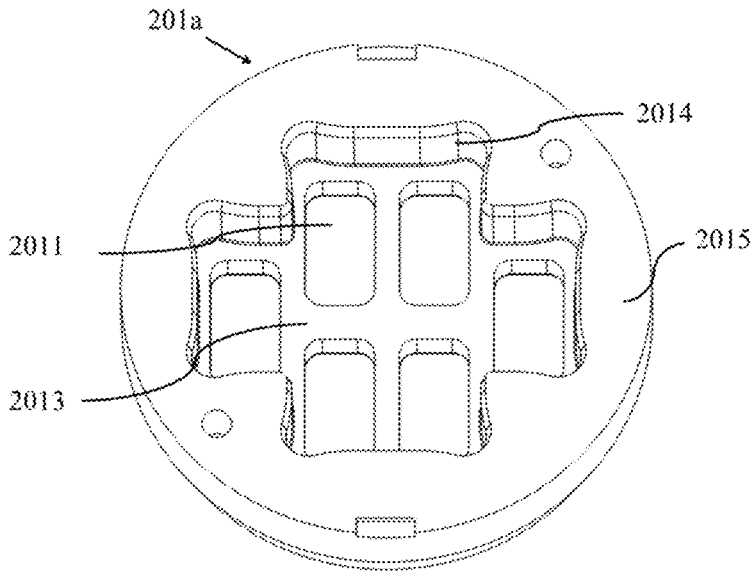
FIG. 10d illustrates a perspective view of a seat of the reed valve assembly, in accordance with an embodiment of the present disclosure.

FIG. 10d shows that the top plate 201a is configured with at least one seating surface 2013 that entirely surrounds the at least one opening 2011 of the top plate. Further, the guard plate 202a and a carrier 203 hold and position each reed valve core 100 so that its top wall 1011, which is configured as a seating surface, seats against the seating surface 2013 surrounding the fluid inlet 2011 on the top plate 201a that the fluid inlet 1011a on the top surface of the reed valve core 100 is coupled to. Furthermore, the seating surface 2013 on the top plate 201a will completely surround the fluid inlet 1011a on the reed valve core 100 that it is coupled to, ensuring that any fluid going through the inlet 2013 can only pass through the fluid inlet 1011a of the reed valve core 100 coupled to it, without any leakage. To ensure there is no leakage, the seating surface on the top plate 201a and the top wall 1011 of the reed valve core 100 have to be very flat with no defects, and they need to be pressed together in the assembly with a force that prevents the passage of fluid between the two seating surfaces. As described earlier, the carrier 203, with its deflecting structure 2034, ensures the required force in the valve assembly 200c. In some embodiments of the reed valve assembly 200c, a gasket material may be placed between the two seating surfaces to ensure a non-leaking interface. This could be a single gasket for all the reed valve cores 100 in a reed valve assembly 200c, or it could be individual gaskets for the seating surface 1011a of each reed valve core 100. Because the top plate 201a is configured with a seating surface in this embodiment of the reed valve assembly 200c, the top plate 201a is also commonly referred to as a valve seat.

As shown in FIG. 10c, the lower portion of the reeds 102 in each reed valve core 100 are adjacent to a guard wall 2021 that acts as a petal guard. There is no wall adjacent to the top portion 1023 of the reeds 102 in the reed valve assembly 200c. In this embodiment of the reed valve assembly 200c, there is a single guard plate 202a made from one block of material, typically metal or plastic, which integrates all the guards 202 for all the six reed valve cores 100 in the reed valve assembly 200c. The outer diameter of the guard plate 202a is substantially equivalent to that of the valve seat 201a, and the two are attached to one another in the reed valve assembly 200c by means of fasteners 500. The mating surface 2015 of the valve seat 201a is pressed against the mating surface 2025 of the valve guard plate 202a in the reed valve assembly 200c, creating a split line 2003. Typically, no gasket is used between these mating surfaces, and it is important to maintain the flatness and quality of these mating surfaces, along with the proper assembly of the valve ensuring the correct pressure on the mating surfaces, to ensure that there is no leakage through the split line 2003. However, when a valve is disassembled to replace the internals of the valve, there is a good chance of damaging the mating surfaces, thereby creating a leak path that detrimentally affects the performance of the valve and the compressor.

FIG. 10d shows that there is a pocket 2014 built into the valve seat 201a that encloses the reed valve cores 100 and ensures that the mating surfaces of the valve seat and valve guard plate are in contact in the valve assembly. It is obvious to a person of skill that the pocket 2014 could be built into the guard plate 202a or could be distributed between the valve seat 201a and the guard plate 202a. Alternatively, one or more spacer plates could be sandwiched between the seat plate and the guard plate to encapsulate the reed valve cores 100 in the valve assembly 200c.

The reed valve assembly 200c has a first flange 2001 near the inlet side of the valve and second flange 2002 near the discharge side of the valve. In the case of a suction valve, a gasket is placed on the second flange 2002. The second flange 2002is pressed against a mating surface on the compressor cylinder 901 to ensure that gas does not leak past these mating surfaces. However, it can be seen that, in the case of a suction valve, high pressure gas from the cylinder can freely enter the valve housing through the openings at the discharge side of the guard plate 202a during operation. This high-pressure gas can leak through the split line 2003 between the valve seat 201a and the valve guard plate 202a.

Figure 11A:
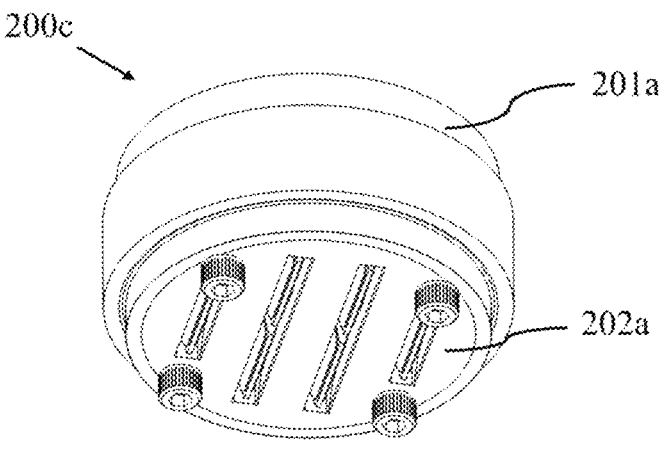
FIG. 11a illustrates a perspective view (11a) of a reed valve assembly, in accordance with the present disclosure.
Figure 11B:
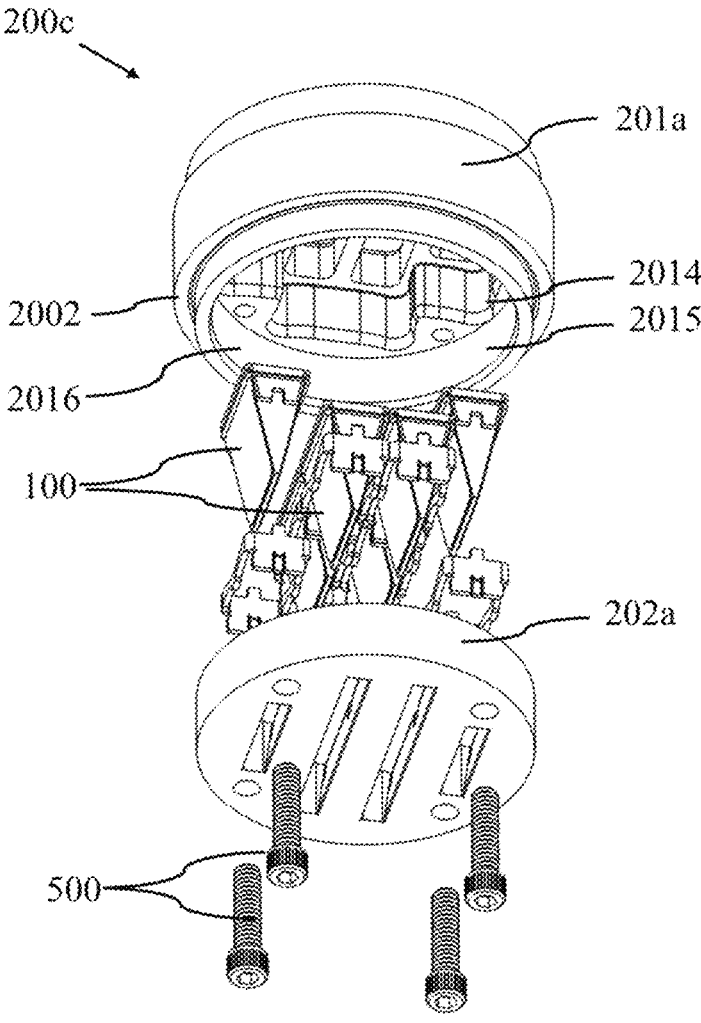
FIG. 11b illustrates an exploded view (11b) of the reed valve assembly, in accordance with the present disclosure.

FIGS. 11, 11a, and 11b depict a reed valve assembly 200c for use in compressors that eliminates the leak path through the split line 2003. In this embodiment of the reed valve assembly 200c, the valve seat 201a has a circular recess 2016 at the discharge portion of the valve seat, just downstream of the pocket 2014. The guard plate 202a is sized to fit in this recess 2016 and is fastened to the seat plate 201a. In this embodiment, the fasteners 500 are threaded to fasten the guard plate 202a to the seat plate 201a. The mating surface 2015 of the seat plate 201a and the mating surface 2025 of the guard plate 202a come into contact within the seat plate and are encapsulated by the seat plate. When used as a suction valve, the second flange 2002 is used to prevent gas in the compressor cylinder 901 from leaking around the valve 200c. There is no split line 2003 in this reed valve assembly 200c upstream of the flange 2002. Therefore, this design eliminates the leak path through the split line 2003 in the reed valve assemblies 200 shown in FIG. 10-d and in the prior art one-way valves shown in FIG. 1.

Figure 12A:
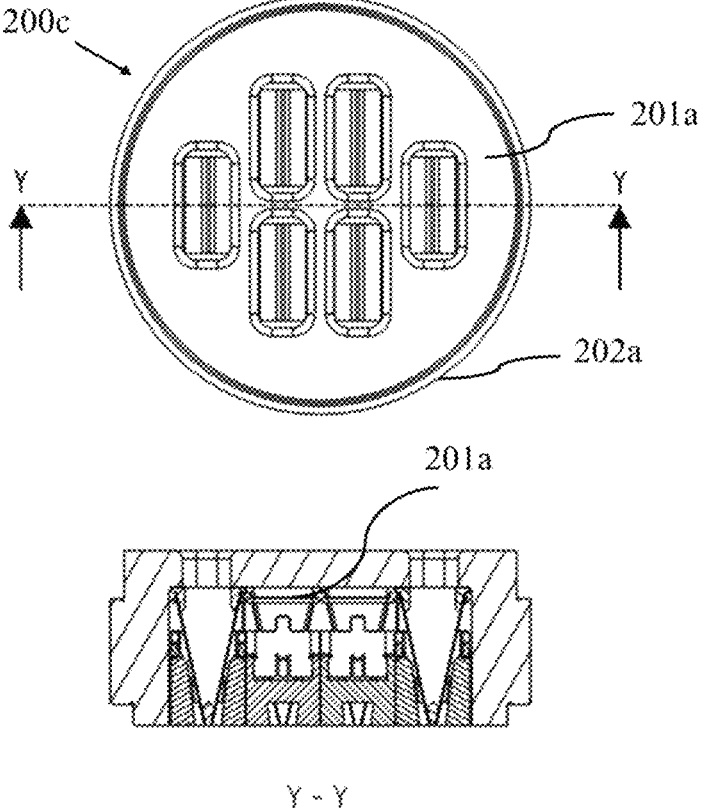
FIG. 12a illustrates a top view and cross-sectional view of an embodiment of a reed valve assembly, in accordance with an embodiment of the present disclosure.
Figure 12B:
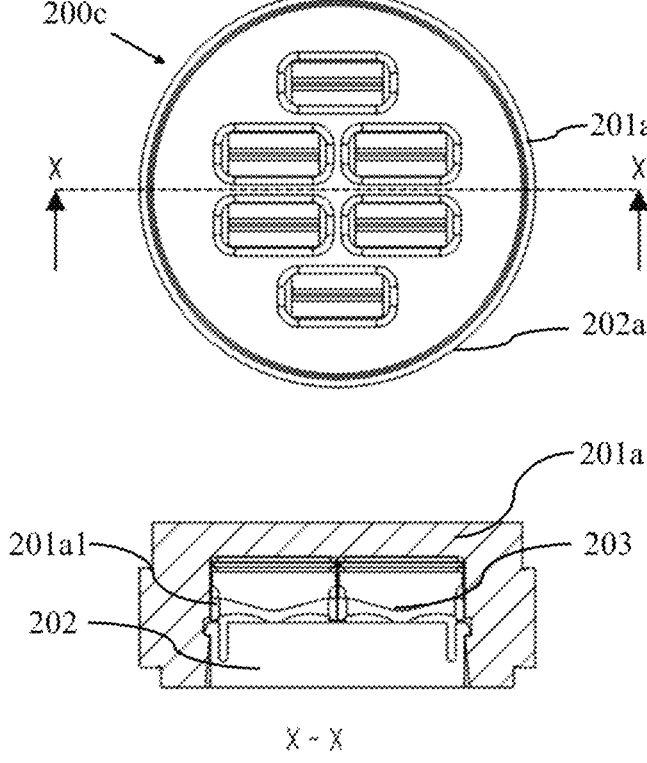
FIG. 12b illustrates a top view and a cross-sectional view from another direction of the embodiment of the reed valve assembly, in accordance with the present disclosure.
Figure 12C:
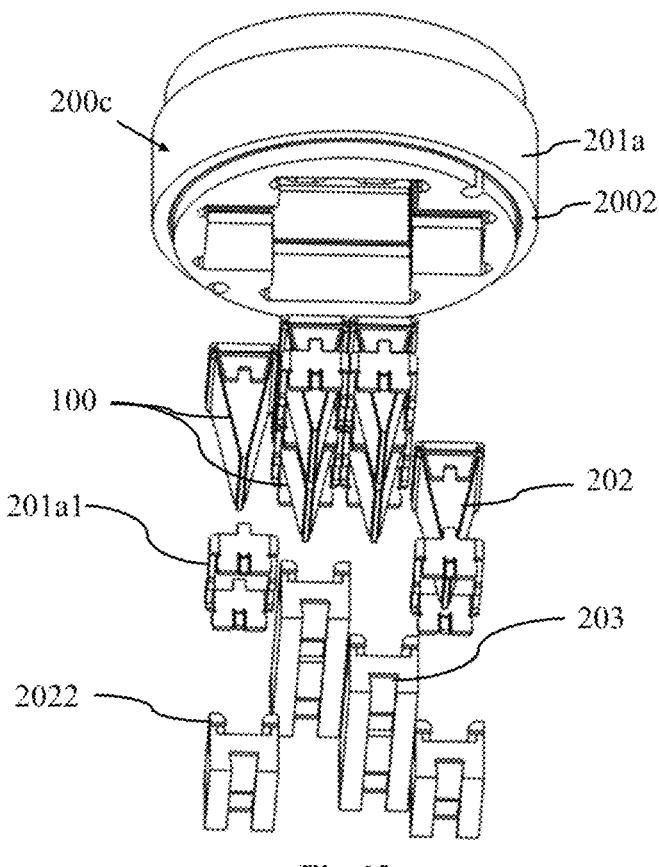
FIG. 12c illustrates an exploded view of an embodiment of the reed valve assembly, in accordance with the present disclosure.

FIGS. 12 and 12-1-c depict a reed valve assembly 200c for use in a reciprocating compressor. FIGS. 12a and 12b have a top view of the reed valve assembly 200c and a cross-sectional view below it at the section designated by the arrows on the top view, respectively, while FIG. 12c is an exploded view. This embodiment has six reed valve cores 100, each supported by an independently removable carrier 203. There are four individual guards 202 that hold the six reed valve cores 100. The middle two guards 202 hold two reed valve cores 100 each and the end guards 202 hold one reed valve core 100 each, as is shown in FIG. 12a. FIGS. 12b and 12c show that the ends of each guard 202 have a snap-fit mechanism 2022 that snaps the guard 202 in place into a shelf 201al machined into the seat plate 201a of the reed valve assembly 200c. There is no split line 2003 in this reed valve assembly 200c. The reed valve cores 100 and guards 202 are all held completely within a single-piece seat plate 201a. Therefore, this design also eliminates the leak path through the split line 2003 in the reed valve assemblies shown in FIG. 10 and the prior art one-way valve shown in FIG. 1. Furthermore, the use of snap-fit guards 202 eliminates the use of threaded fasteners for attachment of the guard 202 to the seat plate 201a. Threaded fasteners can back out in operation due to vibrations and cause valve failure. Therefore, this design eliminates that problem.

Figure 13A:
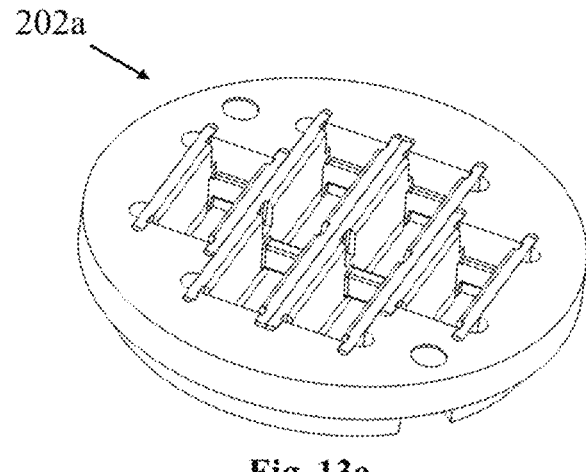
FIG. 13a illustrates a perspective view of a guard plate assembly for a reed valve assembly, in accordance with an embodiment of the present disclosure.
Figure 13B:
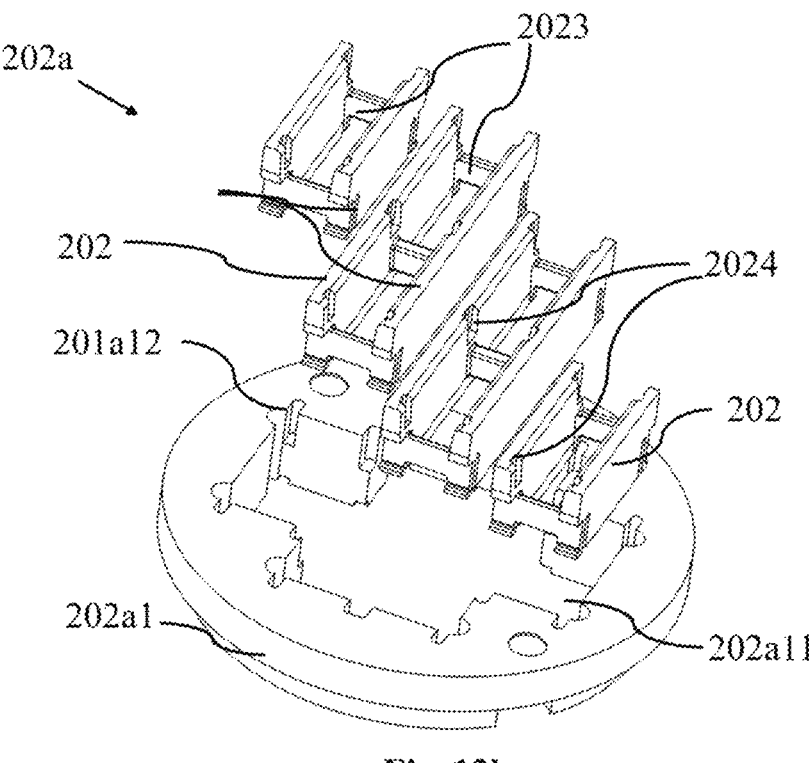
FIG. 13b illustrates an exploded view of the guard plate assembly for a reed valve assembly, in accordance with an embodiment of the present disclosure.

The guard plate 202 may comprise a unitary structure, as in a guard plate 202a that is shown in FIG. 13a, which could be machined as a single piece with integrated multiple guards 202, transverse ribs 2023, and notches 2024 to hold carriers 203, although this would be an expensive approach. Alternatively, and perhaps preferentially, a guard plate 202al has an aperture 202a11 in the middle of the guard plate 202*al* and several individual guards 202 that traverse the aperture 202*a*11. The guards 202 may utilize snap-fit mechanisms 2022 at both ends to engage with notches 2024 and shelves 202*a*12 in the guard plate 202*al*, though force fit or other similar fastening structures may be used. The individual guards 202 have profiled walls that act as petal guards for the reed valve cores 100 they carry. Similar to the guards 202 shown in FIG. 12, these guards 202 may be made cost effectively by casting or molding, for example, with all the required features. These guards 202 may be made with different wall profiles and used in different reed valve assemblies, as may be required. It also is possible to make the guards 202 using different materials for the guard plate 202*al* to serve specific applications. Particular plastics or metals may provide better damping of the impact force of the reeds 102 in the reed valve core 100 chemical resistance, or manufacturability. The guards 202 in the reed valve assembly 200 are removable so that in the case a guard 2020 is damaged during operation, it would be possible to replace that single guard 202 instead of replacing the entire guard plate 202*a*. Moreover, if the operating conditions change and a different lift is required for the reed valve cores 100 in the reed valve assembly 200, it would be a simple matter to change out the guards 202 in the guard plate 202*a* to guards 202 having the required lift profile.

Figure 14A:
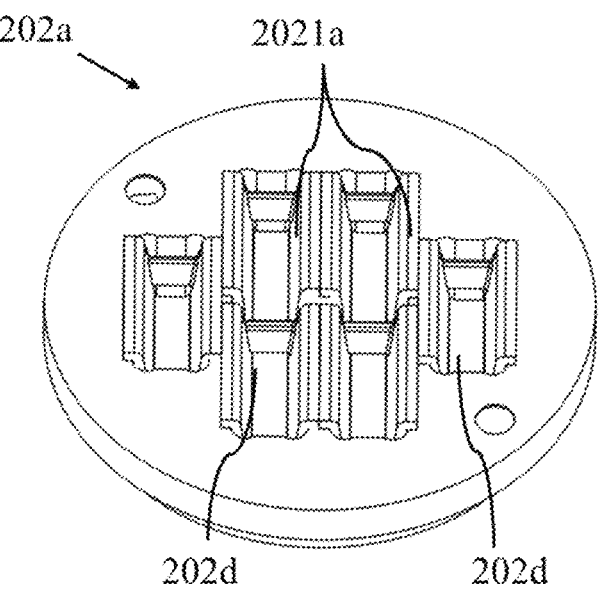
FIG. 14a illustrates a perspective view of a guard plate, in accordance with an embodiment of the present disclosure.
Figure 14B:
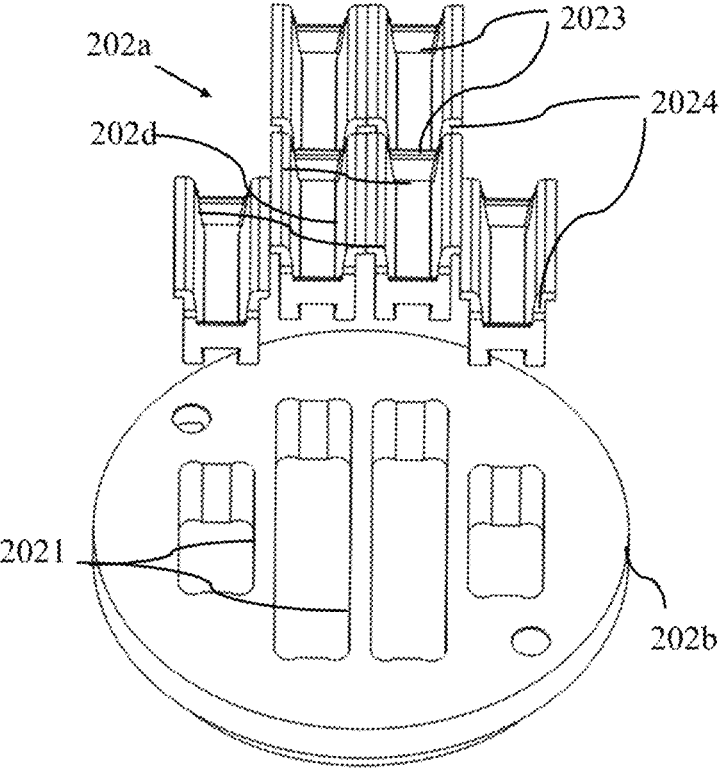
FIG. 14b illustrates an exploded view of the guard plate, in accordance with an embodiment of the present disclosure.

Alternatively, as is shown in FIGS. 14*a-b*, a guard plate 202*b* is depicted wherein the integral guards 202*f* have guard walls 2021 that are vertical and flat. Insertable petal guards 202*d* are provided with the required profile 2021*a* to the guard walls 2021 to function as reed stop walls 202*d* for the reeds 102 in a reed valve core 100. This includes transverse ribs 2023 as well as notches 2024 to position and lock the reed valve cores 100 in place. The modularity of the guard plate 202*a* utilizes the insertable petal guards 202*d*, which can be easily and cost effectively machined from a single block of material, such as, but not limited to, metal, such as Inconel, engineering plastic, or the like, using injection molding, casting, or additive manufacturing. The materials can absorb the impact forces of the reeds 102 of the reed valve core 100.

Figure 15A:
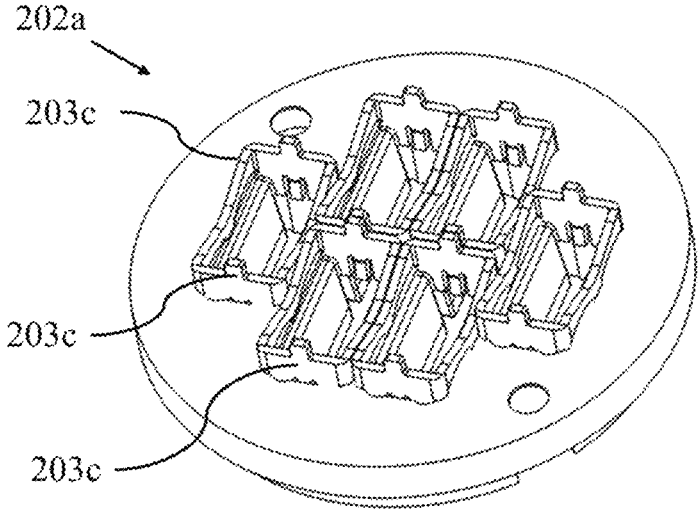
FIG. 15a illustrates a perspective view of a guard plate and carriers, in accordance with an embodiment of the present disclosure.
Figure 15B:
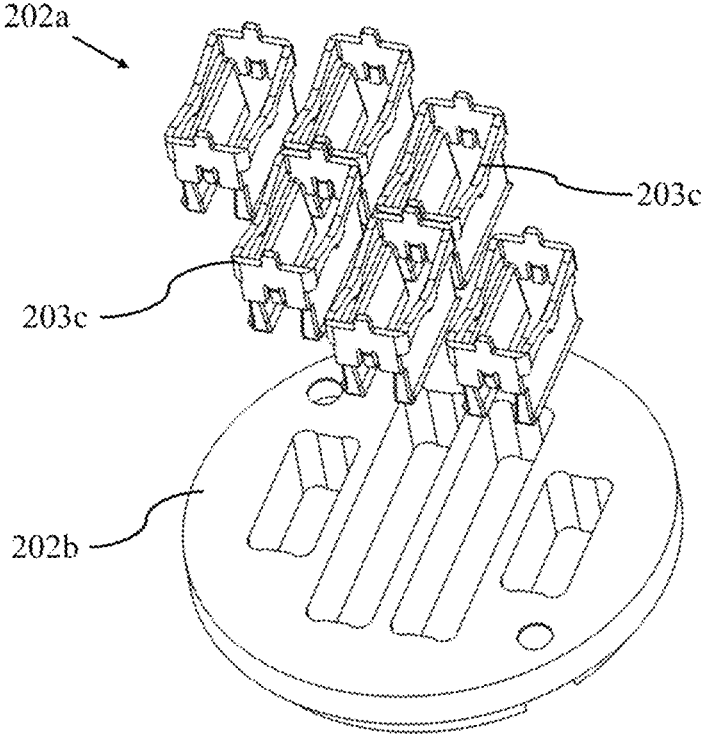
FIG. 15b illustrates an exploded view of a guard plate and carriers, in accordance with an embodiment of the present disclosure.

Alternatively, as is shown in FIGS. 15*a-b*, a guard plate 202*c* is depicted that incorporates both a carrier and reed stop walls 202*d*. The guard plate 202*c* is an assembly of a guard plate 202*b*, where the integral guards 202 have vertical flat walls and carriers 203*c* that incorporate reed stop walls 202*d*, as is described above. This embodiment of the guard plate 202*c* has reed stop walls 202*d* and deflecting carriers for the reed valve cores 100 and has the benefit of utilizing a guard plate 202*b*, described in the paragraph above, and adding to it individual carriers 203*c* for every reed valve core 100 with reed stop walls 202*d*.

FIGS. 14 a-b and 15 a-b illustrate conversions of guards 202 of a prior art reed valve assemblies to accommodate the removable reed valve cores 100 of this disclosure without the need to incur the expense of replacing the entire reed valve assembly 200.

According to another embodiment of the present disclosure, a method for assembling a reed valve core is provided and is illustrated in FIG. 16. The method includes a first step of providing a reed 102, a reed cage 101, and a securing band 103. This is followed by positioning the reed 102 on a sidewall 1018 of a reed cage 101 to cover a fluid outlet 1015 positioned therein. The securing band 103 then is positioned over the reed 102 and the reed cage 101 to securely fasten the top portion 1023 of the reed 102 to the top portion 1012*a* of the sealing faces 1012 of the reed cage 101. The securing band 103 positioning defines a bending axis for the reed 102 to articulate and displace the reed 102 from the reed cage 101 upon a fluid pressure differential being exerted on the reed 102.

The present disclosure provides a compact, cost effective and easily maintainable reed valve assembly 200 that overcomes the limitations of conventional art. The reed valve assembly 200 is manufactured with replaceable components that can be standardized to be interchangeable across valves of different sizes used in different applications in compressors built by different OEMs. The design presented in this disclosure improves the valve's reliability, reduces its power consumption, reduces emissions of the machinery incorporating these valves, reduces its cost to manufacture, reduces the cost of service and reduces the cost of inventory to maintain machines running with these valves. In the present disclosure, the valves have removable reed valve cores 100 that comprise all the wearing components of the valve, namely the reeds 102 and reed cages 101, that can be independently replaced from the valve during service.

In the present disclosure, the housing does not require any machining during service as it does not undergo any wear unlike the housings of conventional valves. Servicing the valve involves cleaning the housing of dirt and replacing only the worn reed valve cores 100 that comprise all the wear components of the valve. By replacing only the parts that wear, without performing any machining operations, the cost of servicing the valve is minimized. This enables the servicing of the valves to be carried out on-site instead of transporting it to a precision machine shop. This further reduces the cost of maintenance of the valves, and the time taken to perform the service in order to have the valves ready to be reinstalled in the compressor. This eliminates the need to have spare valves on site, that are required to reduce the down time of the compressor and the lost production as a result of the down time.

As the components of the valves are standardized and interchangeable, the quantity of spare parts that need to be stocked by a manager of a fleet of compressors is reduced to a fraction of the spare parts that would be required to support the fleet if it were using conventional valves. Further, the present disclosure provides valves that can be used as one-way valves in applications other than compression. This includes non-return valves for pipelines and turbomachinery, relief valves and engine scavenger valves. Because the present disclosure uses reed valve technology, these valves can be made with response times that are much faster than is possible with conventional valves—which is important when these valves are used to protect critical machinery.

Further, components of the present disclosure such as the reed cage 101, the securing band 103 and the reed stop walls improve the reliability and efficiency of the reed valve. The securing band 103 ensures that there is no relative movement between the reed 102 and the reed cage 101 and defines the bending axis of the reed 102 that cannot change during operation as is the case with prior art. The design of the reed stop wall acting only on a lower portion of the reed 102 and keeping the upper portion of the reeds 102 open allow the valves to operate reliably in dirty gas applications. The reed cage 101 design where the reed 102 is supported by the wall of the sealing face rather than the exposed end of ribs, increases the flow area of each reed valve core 100 that improves the performance of the compressor the valve is used in, reducing its power consumption, increasing flow and reducing emissions.

Further, the present disclosure utilizes the securing band 103 to secure the reeds 102 with the reed cage 101. Thus, the reed valve core 100 can be used in a valve assembly without an external seat. The external seat adds clearance to a compressor cylinder when the valve is used as a discharge valve, thereby reducing its volumetric efficiency. Therefore, the designs of the reed valve core of this disclosure lead to improved performance in compressors where volumetric efficiency is important. In conventional reed valve assemblies with removable modules comprising of the reed cage 101, a reed 102 and a housing incorporating petal guards, these modules have to be housed in a valve assembly that has an external seat to hold the components of the module in place. The reeds 102 and the reed cage 101 can move relative to one another during operation resulting in a bending axis that is not fixed-which can result in premature failure. The presence of the petal guard in the removable module, that does not wear at the same rate as the reed cage 101 and the reeds 1021, results in its unnecessary replacement every time the valve is serviced. It also increases the number of spare parts, by several factors, that need to be stocked when maintaining a fleet of dissimilar compressors. Therefore, the present disclosure has the advantage in that it simplifies the design, improves performance of compressors, reduces the cost of manufacturing, reduces the inventory that needs to be stocked, requires less maintenance and reduces the cost of operations of compressors using these valves.

Further, conventional valve assemblies have a single-piece guard that is attached to the seat by means of threaded fasteners. The interface, between the valve seat and guard in a suction valve, results in a split line that is a leak path for high pressure fluid in the valve assembly and can cause a deterioration in the performance of the compressor or pump. The threaded fasteners could back out due to vibration causing the valve to fail and cause catastrophic damage to the compressor or pump. The present disclosure mitigates the issue with designs that eliminate the split line and hence the leak path for the fluid. Designs are also presented where threaded fasteners are eliminated making the valves more reliable.

Still further, the present disclosure discloses a carrier that provides a controlled deflection/stiffness to the reed valve cores 100 that allows a looser tolerance or greater variation in height of the reed valve core 100, reducing the cost of manufacture of the reed valve core 100s, improving the reliability of the valve due to its ability to tolerate a wider range of temperature, and improving the ability to interchange cores between valves of different sizes and used in different applications.

Still further, in the present disclosure, the presence of a carrier enables accommodation of differential expansion of the reed valve core 100. In conventional valve assemblies, differential thermal expansion of reed valve core 100 may result in leakage. The present disclosure mitigates the issue of leakage due to thermal expansion.

Still further, the present disclosure enables a controlled gasket sealing pressure. This reduces the leakage of gas between the sealing face of the reed valve core 100 and valve seat.

Because various possible embodiments might be made of the above invention, and because various changes might be made in the embodiments above set forth, it is to be understood that all matter herein described or shown in the accompanying drawings is to be interpreted as illustrative and not to be considered in a limiting sense. Thus, it will be understood by those skilled in the art of creating independent multi-layered virtual workspace applications designed for use with independent multiple input systems that although the preferred and alternate embodiments have been shown and described in accordance with the Patent Statutes, the invention is not limited thereto or thereby.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The present invention and some of its advantages have been described in detail for some embodiments. It should be understood that although the system and process is described mostly with reference to reciprocating compressor applications, the system and process may be used in other contexts as well. It should also be understood that various changes, substitutions and alterations can be made herein without departing from the scope of the invention as defined by the appended claims. An embodiment of the invention may achieve multiple objectives, but not every embodiment falling within the scope of the attached claims will achieve every objective. Moreover, the scope of the present application is not intended to be limited to the particular embodiments of the process, machine, manufacture, and composition of matter, means, methods and steps described in the specification. A person having ordinary skill in the art will readily appreciate from the disclosure of the present invention that processes, machines, manufacture, compositions of matter, means, methods, or steps, presently existing or later to be developed are equivalent to, and fall within the scope of, what is claimed. Accordingly, the appended claims are intended to include within their scope such processes, machines, manufacture, compositions of matter, means, methods, or steps.

I claim:

1. A reed valve core comprising:
a reed cage with a top wall and two or more sidewalls defining an interior space of the reed cage, the top wall having a fluid inlet positioned therein, at least one sidewall having a fluid outlet positioned therein and defining a sealing face around the fluid outlet;
a reed positioned over the fluid outlet, wherein the reed is configured to seal and occlude a flow of fluid through the fluid outlet; and
a continuous elastic securing band positioned over and fully encircling the reed and the reed cage to fasten a top portion of the reed to a top portion of the at least one sidewall, wherein the position of the securing band defines a bending axis for the reed to articulate and displace the reed from the reed cage upon a fluid pressure differential being exerted on the reed.

2. The reed valve core of claim 1, wherein:
the top portion of the at least one sidewall has a groove extending therein:
the top portion of the reed has a notch extending therein;
the securing band is positioned within the grooves on the top portion of the at least one sidewall of the reed cage and the notches in the edges of the top portion on the reed, wherein the securing band fastens the reed to the reed cage along the bending axis of the reed and maintains a position of the reed relative to the reed cage.

3. The reed valve core of claim 2, wherein the securing band is comprised of an elastic material stretchable over the sidewalls of the reed cage during assembly and applying a force upon rebounding to secure the top portion of the reed to the top portion of the at least one sidewall.

4. The reed valve core of claim 1, wherein the securing band is continuous or non-continuous.

5. The reed valve core of claim 1, further including a protuberance being attached to the at least one sidewall and extending into the interior space of the reed cage.

6. The reed valve core of claim 1, wherein the top portion of the reed has cutouts extending thereinto and across the bending axis such that the securing band fits into the cutouts.

7. A reed valve core comprising:

a reed cage with a top wall and two or more sidewalls defining an interior space of the reed cage, the top wall having a fluid inlet positioned therein, at least one sidewall having a fluid outlet positioned therein and defining a sealing face around the fluid outlet;

a reed positioned over the fluid outlet, wherein the reed is configured to seal and occlude a flow of fluid through the fluid outlet; and a securing band positioned over the reed and the reed cage to fasten a top portion of the reed to a top portion of the at least one sidewall, wherein the position of the securing band defines a bending axis for the reed to articulate and displace the reed from the reed cage upon a fluid pressure differential being exerted on the reed; and wherein the top portion of the reed is configured to be wider than a void in an external guard or carrier of a reed valve assembly, wherein the wide portion extending below the bending axis, in the event of a reed failure along the bending axis during operation, will be retained in the interior space.

8. The reed valve core of claim 1, wherein:

a thickness of the at least one sidewall is configured to support the pressure differential acting on it; and the width of the fluid outlet in the at least one sidewall is sized to support the reed in its closed position with the pressure differential acting on it.

9. A reed valve core comprising:

a reed cage with a top wall and two or more sidewalls defining an interior space of the reed cage, the top wall having a fluid inlet positioned therein, at least one sidewall having a fluid outlet positioned therein and defining a sealing face around the fluid outlet;

a reed positioned over the fluid outlet, wherein the reed is configured to seal and occlude a flow of fluid through the fluid outlet; and a securing band positioned over the reed and the reed cage to fasten a top portion of the reed to a top portion of the at least one sidewall, wherein the position of the securing band defines a bending axis for the reed to articulate and displace the reed from the reed cage upon a fluid pressure differential being exerted on the reed;

a thickness of the at least one sidewall is configured to support the pressure differential acting on it;

the width of the fluid outlet in the at least one sidewall is sized to support the reed in its closed position with the pressure differential acting on it; and wherein a section of the at least one sidewall between two adjacent fluid outlets in the at least one sidewall is reinforced by a rib.

10. The reed valve core of claim 1, wherein an end sidewall of the reed cage lacking a fluid outlet is reinforced by a rib.

11. The reed valve core of claim 9, wherein a top surface of the rib is below a top of the fluid outlet and angles upwardly to a top portion of the section of the at least one sidewall it reinforces.

12. The reed valve core of claim 10, wherein a top surface of the rib is below a top of the fluid outlet and angles upwardly to a top portion of the end sidewall it reinforces.

13. A reed valve assembly or machine, or component thereof, with at least one removable reed valve core comprising:

a top plate having a fluidic opening positioned therein;

the reed valve core being coupled to the top plate and comprising:

a reed cage with a top wall and two or more sidewalls defining an interior space of the reed cage, the top wall having a fluid inlet positioned therein, at least one sidewall having a fluid outlet positioned therein and defining a sealing face;

a reed positioned over the fluid outlet, wherein the reed is configured to seal and occlude a flow of fluid through the fluid outlet; and a continuous elastic securing band positioned over and fully encircling the reed and the reed cage to fasten a top portion of the reed to a top portion of the at least one sidewall, wherein the position of the securing band defines a bending axis for the reed to articulate and displace the reed from the reed cage upon a fluid pressure differential being exerted on the reed;

a guard configured to hold the reed valve core in position against the top plate; and wherein the reed valve core is removable from the reed valve assembly or machine, or component thereof.

14. A reed valve assembly or machine, or component thereof, with at least one removable reed valve core comprising:

a top plate having a fluidic opening positioned therein;

the reed valve core being coupled to the top plate and comprising:

a reed cage with a top wall and two or more sidewalls defining an interior space of the reed cage, the top wall having a fluid inlet positioned therein, at least one sidewall having a fluid outlet positioned therein and defining a sealing face;

a reed positioned over the fluid outlet, wherein the reed is configured to seal and occlude a flow of fluid through the fluid outlet; and a securing band positioned over the reed and the reed cage to fasten a top portion of the reed to a top portion of the at least one sidewall, wherein the position of the securing band defines a bending axis for the reed to articulate and displace the reed from the reed cage upon a fluid pressure differential being exerted on the reed;

a guard configured to hold the reed valve core in position against the top plate;

wherein the reed valve core is removable from the reed valve assembly or machine, or component thereof; and wherein the guard is configured with a reed-stop wall adjacent to the reed of the reed valve core, the guard being configured to engage with a lower portion of the reed, leaving the top portion of the reed open and limiting a lift of the reed during operation.

15. The reed valve assembly of claim 13, wherein the guard comprises transverse ribs to prevent the egress of failed components of the reed valve core during operation.

16. The reed valve assembly of claim 13, wherein the guard is removable.

17. The reed valve assembly of claim 13, wherein the guard is integrated with a guard plate, the guard plate being selectively fastenable to the top plate.

18. A reed valve assembly or machine, or component thereof, with at least one removable reed valve core comprising:

a top plate having a fluidic opening positioned therein;

the reed valve core being coupled to the top plate and comprising:

a reed cage with a top wall and two or more sidewalls defining an interior space of the reed cage, the top wall having a fluid inlet positioned therein, at least one sidewall having a fluid outlet positioned therein and defining a sealing face;

a reed positioned over the fluid outlet, wherein the reed is configured to seal and occlude a flow of fluid through the fluid outlet; and a securing band positioned over the reed and the reed cage to fasten a top portion of the reed to a top portion of the at least one sidewall, wherein the position of the securing band defines a bending axis for the reed to articulate and displace the reed from the reed cage upon a fluid pressure differential being exerted on the reed;

a guard configured to hold the reed valve core in position against the top plate;

wherein the reed valve core is removable from the reed valve assembly or machine, or component thereof; and a carrier configured to hold and position the reed valve core within the reed valve assembly between the top plate and the guard.

19. The reed valve assembly of claim 18, wherein the carrier is comprised of a compliant structure enabling the reed valve core to deflect to perform at least one of the following: accommodate thermal gradients, accommodate differences in tolerance stack ups, and provide a defined gasket pressure between a seating surface of the reed cage and a seat face of the reed valve assembly or machine, or component thereof.

20. The reed valve assembly of claim 18, wherein the carrier comprises a reed-stop wall configured to engage with a lower portion of the reed, leaving the top portion of the reed open, limiting the deflection of the reed during operation.

21. The reed valve assembly of claim 18, wherein the carrier is removable.

22. The reed valve assembly of claim 13, wherein:

the top plate includes a first seating surface surrounding the fluidic opening;

the top wall of the reed cage in the reed valve core is configured as a second seating surface; and the guard is configured to secure and position the reed valve core by maintaining the second seating surface in contact with the first seating surface ensuring fluid communication between the fluidic opening in the top plate and the fluid inlet in the top wall of the reed cage.

23. A reed valve assembly or machine, or component thereof, with at least one removable reed valve core comprising:

a top plate having a fluidic opening positioned therein;

the reed valve core being coupled to the top plate and comprising:

a reed cage with a top wall and two or more sidewalls defining an interior space of the reed cage, the top wall having a fluid inlet positioned therein, at least one sidewall having a fluid outlet positioned therein and defining a sealing face;

a reed positioned over the fluid outlet, wherein the reed is configured to seal and occlude a flow of fluid through the fluid outlet; and a securing band positioned over the reed and the reed cage to fasten a top portion of the reed to a top portion of the at least one sidewall, wherein the position of the securing band defines a bending axis for the reed to articulate and displace the reed from the reed cage upon a fluid pressure differential being exerted on the reed;

a guard configured to hold the reed valve core in position against the top plate;

wherein the reed valve core is removable from the reed valve assembly or machine, or component thereof; and wherein the guard is configured to fit within a recess in the top plate, thereby eliminating a split-line leak path between the top plate and the guard.

24. The reed valve assembly of claim 13, wherein the guard is configured to snap-fit with a shelf within a recess in the top plate to eliminate a split line path of leakage between the top plate and the guard.

25. The reed valve assembly of claim 13, further comprising a guard plate having an aperture centrally positioned therein, a guard being fastened to the guard plate.

26. A reed valve assembly or machine, or component thereof, with at least one removable reed valve core comprising:

a top plate having a fluidic opening positioned therein;

the reed valve core being coupled to the top plate and comprising:

a reed cage with a top wall and two or more sidewalls defining an interior space of the reed cage, the top wall having a fluid inlet positioned therein, at least one sidewall having a fluid outlet positioned therein and defining a sealing face;

a reed positioned over the fluid outlet, wherein the reed is configured to seal and occlude a flow of fluid through the fluid outlet; and a securing band positioned over the reed and the reed cage to fasten a top portion of the reed to a top portion of the at least one sidewall, wherein the position of the securing band defines a bending axis for the reed to articulate and displace the reed from the reed cage upon a fluid pressure differential being exerted on the reed;

a guard configured to hold the reed valve core in position against the top plate;

wherein the reed valve core is removable from the reed valve assembly or machine, or component thereof; and an adapter configured to be inserted into the guard, the adapter comprising a reed-stop wall configured to engage with a lower portion of the reed of the reed valve core, leaving the top portion of the reed open and limiting the deflection of the reed during operation.

* * * * *